(12) United States Patent
Zheng et al.

(10) Patent No.: US 9,916,091 B2
(45) Date of Patent: Mar. 13, 2018

(54) MEMORY SYSTEM ARCHITECTURE

(71) Applicant: Samsung Electronics Co., Ltd., Suwon-si, Gyeonggi-do (KR)

(72) Inventors: Hongzhong Zheng, Sunnyvale, CA (US); Suhas, San Jose, CA (US); Chaohong Hu, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 54 days.

(21) Appl. No.: 14/932,953

(22) Filed: Nov. 4, 2015

(65) Prior Publication Data
US 2017/0017399 A1 Jan. 19, 2017

Related U.S. Application Data

(60) Provisional application No. 62/191,997, filed on Jul. 13, 2015.

(51) Int. Cl.
*G06F 3/06* (2006.01)

(52) U.S. Cl.
CPC ............ *G06F 3/0604* (2013.01); *G06F 3/064* (2013.01); *G06F 3/0673* (2013.01)

(58) Field of Classification Search
CPC ....... G06F 3/0604; G06F 3/064; G06F 3/0673
See application file for complete search history.

(56) References Cited

U.S. PATENT DOCUMENTS

| | | | |
|---|---|---|---|
| 6,370,668 B1 | 4/2002 | Garrett, Jr. et al. | |
| 7,366,947 B2 | 4/2008 | Gower et al. | |
| 7,487,428 B2 | 2/2009 | Co et al. | |
| 7,587,658 B1 | 9/2009 | Tong et al. | |
| 7,934,052 B2 * | 4/2011 | Prins .................... | G06F 13/1657 711/103 |
| 7,949,931 B2 | 5/2011 | Lastras-Montano | |
| 7,978,516 B2 * | 7/2011 | Olbrich ............... | G06F 13/1657 365/185.11 |
| 8,245,101 B2 * | 8/2012 | Olbrich ............... | G06F 13/1657 714/6.24 |
| 8,301,980 B2 | 10/2012 | Gruner et al. | |
| 8,412,978 B2 | 4/2013 | Flynn et al. | |
| 8,443,263 B2 * | 5/2013 | Selinger ............... | G06F 11/1068 714/768 |
| 8,452,929 B2 * | 5/2013 | Bennett ............... | G06F 11/1441 711/156 |
| 8,707,110 B1 | 4/2014 | Shaeffer et al. | |
| 9,047,211 B2 * | 6/2015 | Wood .................. | G11C 16/349 |

(Continued)

OTHER PUBLICATIONS

Bianca Schroeder et al., "DRAM Errors in the Wild: A Large-Scale Field Study," ACM SIGMETRICS Performance Evaluation Review, vol. 37, No. 1, pp. 193-204, ACM 2009, (URL: http://www.cs.utoronto.ca/~bianca/papers/sigmetrics09.pdf).

(Continued)

*Primary Examiner* — Esaw T Abraham
(74) *Attorney, Agent, or Firm* — Renaissance IP Law Group LLP

(57) ABSTRACT

An embodiment includes a module, comprising: a memory bus interface; circuitry; and a controller coupled to the memory bus interface and the circuitry, and configured to: collect meta-data associated with the circuitry; and enable access to the meta-data in response to a memory access received through the memory bus interface.

12 Claims, 19 Drawing Sheets

(56) References Cited

U.S. PATENT DOCUMENTS

| | | | |
|---|---|---|---|
| 9,286,198 B2 * | 3/2016 | Bennett | G06F 12/00 |
| 9,436,548 B2 | 9/2016 | Goodman et al. | |
| 9,645,829 B2 * | 5/2017 | Jayakumar | G06F 9/4401 |
| 9,697,147 B2 * | 7/2017 | Loh | G06F 13/1668 |
| 9,767,920 B2 | 9/2017 | Kim et al. | |
| 2004/0268046 A1 | 12/2004 | Spencer | |
| 2006/0158917 A1 | 7/2006 | Bartley et al. | |
| 2008/0016429 A1 | 1/2008 | Saneshige et al. | |
| 2008/0046802 A1 | 2/2008 | Honda | |
| 2009/0204871 A1 | 8/2009 | Eggleston et al. | |
| 2010/0058144 A1 | 3/2010 | Rohleder et al. | |
| 2011/0271164 A1 | 11/2011 | Ahn et al. | |
| 2012/0005559 A1 | 1/2012 | Jeong et al. | |
| 2012/0185752 A1 | 7/2012 | Maheshwari et al. | |
| 2013/0198587 A1 | 8/2013 | Kim et al. | |
| 2013/0275682 A1 | 10/2013 | Ramanujan et al. | |
| 2014/0164874 A1 | 6/2014 | Franceschini et al. | |
| 2014/0181614 A1 | 6/2014 | Kwok | |
| 2015/0378841 A1 | 12/2015 | Jayakumar et al. | |

OTHER PUBLICATIONS

Intel, "Intel 975X Express Chipset," Datasheet for the Intel 82975X Memory Controller Hub (MCH), Document No. 310158-001, Nov. 2005, pp. 1-274.

Stuart Schechter et al., "Use ECP, not ECC, for Hard Failures in Resistive Memories," ACM SIGARCH Computer Architecture News, vol. 38, No. 3, pp. 141-152, ACM 2010, IEEE International Workshop on Silicon Debug and Diagnosis 2010 (URL: ftp://net6.cs.utexas.edu/pub/dburger/papers/ISCA10.pdf).

* cited by examiner

MEMORY SYSTEM ARCHITECTURE

CROSS-REFERENCE TO RELATED APPLICATIONS

This application claims the benefit of U.S. Provisional Patent Application No. 62/191,997, filed Jul. 13, 2015, the contents of which is hereby incorporated by reference herein, in its entirety, for all purposes.

BACKGROUND

This disclosure relates to memory system architectures and, in particular, memory system architectures with error correction.

Memory controllers may be configured to perform error correction. For example, a memory controller may read 72 bits of data from a memory module where 64 bits are data and 8 bits are parity. The memory controller may perform other error correction techniques. Using such techniques, some errors in data read from the memory module may be identified and/or corrected. In addition, the memory controller may make information related to the errors available. A system including the memory controller may make operational decisions based on the error information, such as retiring a memory page, halting the system, or the like. Such a memory controller may be integrated with a processor. For example, Intel Xeon processors may include an integrated memory controller configured to perform error correction.

However, if error correction is performed before data is received by the memory controller, the error information related to the correction may not be available in the memory controller and hence, not available to the system for system management decisions.

SUMMARY

An embodiment includes a module, comprising: a memory bus interface; circuitry; and a controller coupled to the memory bus interface and the circuitry, and configured to: collect meta-data associated with the circuitry; and enable access to the meta-data in response to a memory access received through the memory bus interface.

An embodiment includes a system, comprising: a processor including a memory bus interface and configured to: reserve a memory address range for a device coupled to the memory bus interface; and access meta-data associated with the device through the memory address range.

An embodiment includes a method, comprising: reserving a memory address range for a device coupled to a memory bus interface; and access meta-data associated with the device through the memory address range.

An embodiment includes a method, comprising: collecting, at a device, meta-data associated with the device; receiving, at the device, a read access through a memory bus interface; and responding, by the device through the memory bus interface, to the read access with data including at least part of the meta-data.

DETAILED DESCRIPTION

Figure 1:
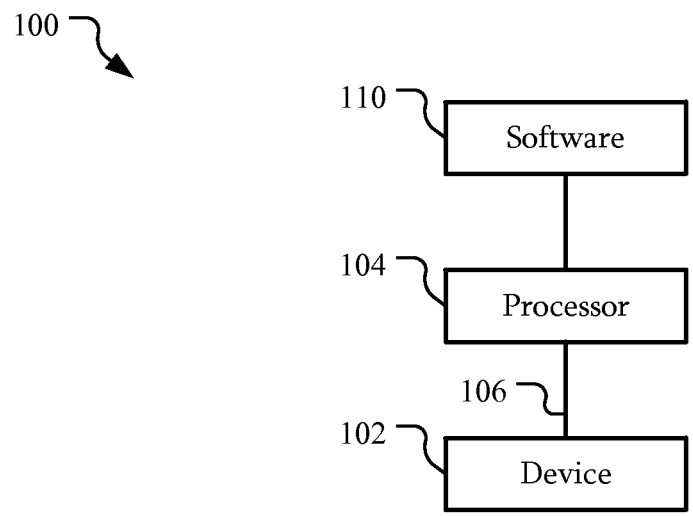
FIG. 1 is a schematic view of a system with a memory system architecture according to an embodiment.

The embodiments relate to memory system architectures. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods and systems provided in particular implementations.

However, the methods and systems will operate effectively in other implementations. Phrases such as an embodiment", one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain steps. However, the method and system may operate according to other methods having different and/or additional steps and steps in different orders that are not inconsistent with the embodiments. Thus, embodiments are not intended to be limited to the particular embodiments shown, but are to be accorded the widest scope consistent with the principles and features described herein.

The embodiments are described in the context of particular memory system architecture having certain components. One of ordinary skill in the art will readily recognize that embodiments are consistent with the use of memory system architectures having other and/or additional components and/or other features. However, one of ordinary skill in the art will readily recognize that the method and system are consistent with other structures. Methods and systems may also be described in the context of single elements. However, one of ordinary skill in the art will readily recognize that the methods and systems are consistent with the use of memory system architectures having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to examples containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of a system with a memory system architecture according to an embodiment. The system 100 includes a device 102, a processor 104, and a memory bus 106. The processor 104 may include any device configured to be operatively coupled to the device 102 and capable of executing instructions. For example, the processor 104 may be a general purpose processor, a digital signal processor (DSP), a graphics processing unit (GPU), an application specific integrated circuit, a microcontroller, a programmable logic device, a combination of such devices, or the like.

The device 102 may be any device capable of being coupled to the memory bus 106 and capable of processing read and/or write requests received through the memory bus 106. As will be described in further detail, the device 102 may be a memory module that may serve as part of the main system memory; however, in other embodiments, devices other than memory devices may be coupled to the memory bus 106.

The processor 104 may be coupled to the device 102 through memory bus 106. The processor 104 and the device 102 may each have a memory bus interface configured to the coupled to the memory bus 106.

The memory bus 106 may include any interface capable of being coupled between system memory (not explicitly illustrated) and the processor 104. For example, the memory bus 106 may include signal lines for data signals, strobe signals, clock signals, enable signals, or the like. That is, the memory bus 106 may be part of a main memory channel that is the interface between the processor 104 and the main system memory.

Software 110 is illustrated as coupled to the processor 104; however, the software 110 represents various programs, drivers, modules, routines, or the like the may be executed on the processor 104. For example, the software 110 may include drivers, kernel modules, daemons, applications, or the like. In some embodiments, the software 110 may enable the processor 104 to be configured to perform particular functions described herein. For example, the processor 104 may include internal portions, such as registers, cache memory, processing cores, or the like, and may also include external interfaces, such as address and data bus interfaces, interrupt interfaces, or the like. The operation of the software 110 may cause the processor 104 to operate in a manner to achieve the operations described with respect to the software.

In an embodiment, the processor 104 is configured to reserve a memory address range for the device 102. The memory address range is part of the addressable range of the memory bus. For example, reserving the memory address range may include negotiation with the device 102 to establish the range, detecting a range that the device 102 is expecting, or the like. Regardless, after configuration, the device 102 may be accessed at least through the memory address range. While the memory address range may in some embodiments be the only address range through which the device 102 is accessed, in other embodiments, the device 102 may be accessible through address ranges outside of the reserved range.

Once the memory address range is reserved, the processor 104 may be configured to access meta-data associated with the device 102 through the memory address range. The meta-data associated with the device 102 may be data about the device 102, data related to operations of the device 102, data related to data stored/managed by the device, or the like. For example, the meta-data may include various device 102 information, such as temperature, status, error information, or the like. The meta-data may include any data about the device 102.

In an embodiment, the processor 104 may be configured to read from an address within the reserved address range. The device 102 may be configured to respond to the read access with at least part of the meta-data associated with the device 102. The processor 104 may also be configured to write to an address within the reserved address range. This address may be the same or different from an address from which the at least part of the meta-data is read. In an embodiment, the processor 104 may be configured to write a command to the device 102.

Although a single device 102 has been used as an example, any number of devices 102 may be coupled to the processor 104 through the memory bus 106. In an embodiment, each device 102 may be coupled to the processor 104 through a dedicated memory bus 106 separate from other devices 102. However, in other embodiments, the memory bus 106 may be shared by more than one device 102. Furthermore, although a single memory bus 106 has been described, multiple memory busses 106 between one or more devices 102 may be present.

Figure 2:
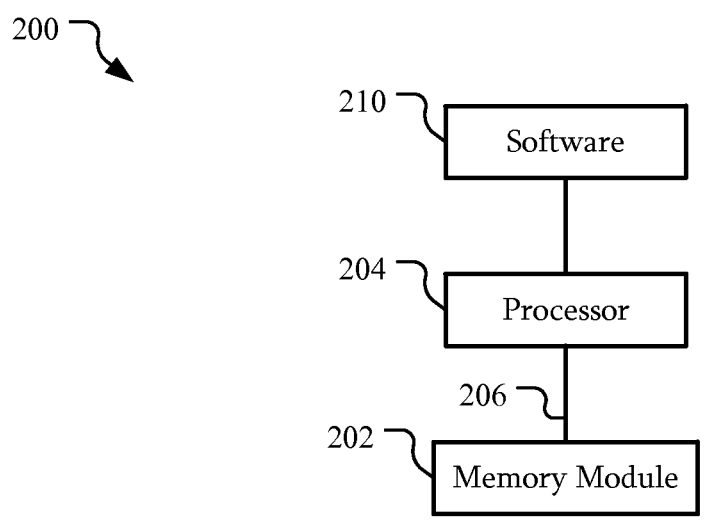
FIG. 2 is a schematic view of a system with a memory system architecture including a memory module according to an embodiment.

FIG. 2 is a schematic view of a system with a memory system architecture including a memory module according to an embodiment. In this embodiment, system 200 includes a processor 204, memory bus 206, and software 210 similar to corresponding portions of system 100 of FIG. 1. However, in this embodiment, the device 102 of FIG. 1 is a memory module 202. The memory module 202 may include any device that is configured to store data received through the memory bus 206. In a particular example, the memory module 202 may be a dynamic random access memory (DRAM) module. The memory module 202 may include a double data rate synchronous dynamic random access memory (DDR SDRAM) according to various standards such as DDR, DDR2, DDR3, DDR4, or the like. In other embodiments, the memory module 202 may include static random access memory (SRAM), non-volatile memory such as Flash, spin-transfer torque magentoresistive random access memory (STT-MRAM), or Phase-Change RAM, or the like.

As described above, the memory module 202 may be configured to store data that is accessible through the memory bus 106. The meta-data associated with the memory module 202 may include error information associated with reading data from the memory module 202. For example, the memory module 202 may be configured to generate error information in response to correcting an error and/or attempting to correct an error in the data read from stored data. The error information may include information about a corrected error, an uncorrected error, an absence of an error, a number of such errors, or the like. Error information may include the actual error, an address of the error, number of times the error has occurred, or other information specific to the memory module 202.

In a particular example, the error information may include information about a single-bit error indicating that the memory module 202 corrected the single-bit error. That is, the memory module 202 may be configured to correct a single-bit error and record error information related to the correction. The memory module 202 may also be configured to detect a double-bit error and record information related to the detection. Although particular numbers of errors corrected and detected have been used as examples, the memory module 202 may be configured to correct any number of errors or detect any number of errors. Moreover, although one or more error correction techniques may result in single-bit error correction and/or double-bit error detection, the memory module 202 may be configured to perform any error correction technique that can correct and/or detect at least one error. Although particular examples of error information have been described, the error information may include any information related to errors.

As described above, meta-data may be accessible through the reserved address range associated with a device 102 of FIG. 1. Similarly, meta-data stored in the memory module 202 may be accessible through the reserved address range. For example, the processor configured to read meta-data associated with the memory module 202 by reading from an address within the reserved address range. That is, a read access to the memory module 202 that would otherwise have accessed data stored in the memory module 202 may be redirected by the memory module 202 to read from a register or other storage location containing the meta-data. In a particular example, as this meta-data may include error information and, in particular, corrected error information, that corrected error information may be available to the processor 204 through a read request.

As described above, a write may be performed to an address within the reserved address range. The write access may include a command. In an embodiment, the command may be associated with error information associated with the memory module 202. For example, the command may include a command to change how error information is gathered, what error information may be available through a read access to an address within the reserved address range, which address within the range will have particular error information, or the like. However, in some embodiments, error information may only be a part of the meta-data that is available. Accordingly, the command may also relate to such other meta-data. For example, the command may indicate what other meta-data may be available through such a read access.

In a particular embodiment, when the processor 204 accesses an address within the reserved address range, the memory module 202 responds differently than it would to an access to a generic address. For example, a write to a given address may not write that data to some data storage in the memory module 202 such that a read to that address would return the written data. In contrast, if a write access is used to write a command to the memory module 202 at the given address, a subsequent read from that address may not return the command, but instead may return meta-data such as error information.

Thus, in an embodiment, the processor 204 is configured to receive error information and, in particular, corrected error information through the data path of the memory bus 206. Specifically, the processor 204 may be configured to receive the error information merely by reading a memory address within the reserved address range.

Figure 3:
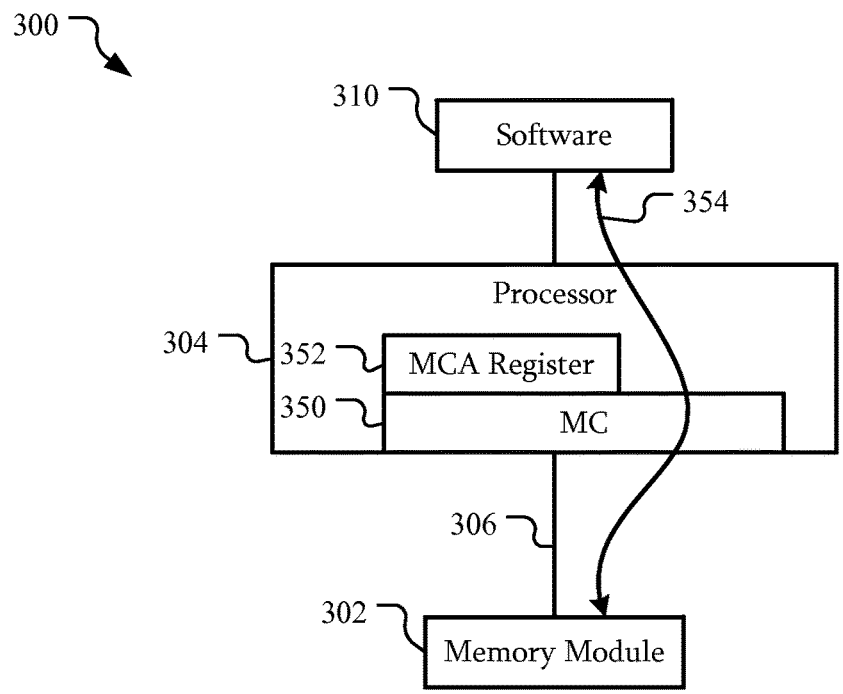
FIG. 3 is a schematic view of a system with a memory system architecture according to an embodiment.

FIG. 3 is a schematic view of a system with a memory system architecture according to an embodiment. In this embodiment, the system 300 includes a memory module 302, a processor 304, and software 310 similar to the memory module 202, processor 204, and software 210 of FIG. 2. However, in this embodiment, the processor 304 includes a memory controller (MC) 350 and a machine check architecture (MCA) register 352.

The memory controller 350 is integrated with the processor 304. The memory controller 350 may be part of a main memory channel that is the main interface between the processor 304 and the memory module 302. The memory controller 350 is configured to control access to the data stored in the memory module 302 through the memory bus 306. In some embodiments, the memory controller 350 may be configured to correct errors, but would not have the opportunity to correct such errors as error correction may have been performed by the memory module 302. However, in this particular example, the memory controller 350 is not configured to correct errors in data read from the memory module 302. The memory controller 350 may not be configured to report any error information based on data read from the memory module 302.

The MCA register 352 is a register in which hardware errors may be reported. For example, cache errors, bus errors, data errors, or the like may be detected and reported in the MCA register 352. However, because the memory controller 350 is not configured to correct errors in data read from the memory module 302, any potential error information based on the data read from the memory module 302 may not be reported in the MCA register 352. Regardless, as described above, the error information may be communicated to the processor 304 through the memory bus 306 through read/write accesses to a reserved address range associated with the memory module 302. Thus, the error information may still be available to the software 310, albeit not through MCA register 352. In contrast, the error information is available through the memory controller 350; however, it is available in a manner in which the memory controller 350 is not aware of the type of data being transferred. That is, from the perspective of the memory controller 350, the access to the reserved address range of the memory module 302 is merely a generic access to a memory module 302. Interaction 354 between the software 310, such as a driver, module, or the like and the memory module 302 causes the generic access through the memory controller 350 to have a different meaning.

In an embodiment, the availability of error information through the memory controller 350 may allow for a lower cost system 300. For example, a processor 304 with the memory controller 350 without any memory error correction may be used, yet error information may still be available. In particular, even if memory error correction is desired, a processor 304 without memory error correction may be used because the error information is available through generic memory accesses. Thus, the software 310, including any software that uses error information, may still operate as if the processor 304 was capable of memory error correction. A processor 304 without error correction may be a lower power, lower cost processor. Thus, an overall power usage and/or cost of the system 300 may be reduced.

However, in other embodiments, the memory controller 350 may be configured to correct errors. While the memory module 302 may also be configured to correct errors, an error may still occur between the memory module 302 and the memory controller 350. The memory controller 350 may be configured to correct such errors. In some embodiments, information related to errors corrected by the memory controller 350 may be combined with error information related to errors corrected by the memory module 302. Thus, the system 300 may have error correction/detection from storage in the memory module 302 to usage in the processor 304.

Furthermore, in some embodiments, existing systems without error correction may be retrofit with devices described herein and configured with appropriate software to enable the error correction operations described herein. For example, a system may include field-replaceable memory modules. This system may initially not be able to correct errors occurring in the memory modules or take any action based on any error information. By replacing one or more of the memory modules with memory modules as described herein and configuring a processor as described herein, error correction and the associated operations described herein may be performed. That is, in some embodiments, replacing the memory modules may be the only hardware change needed to enable the system to perform the error-correction operations and take action based on those error-correction operations as described herein.

Although the memory controller 350 has been illustrated as being integrated with the processor 304, the memory controller 350 may be separate from the processor 304. In other embodiments, the techniques to access the memory module 302 may be different; however, the error information may still be available through generic read/write access.

Figure 4:
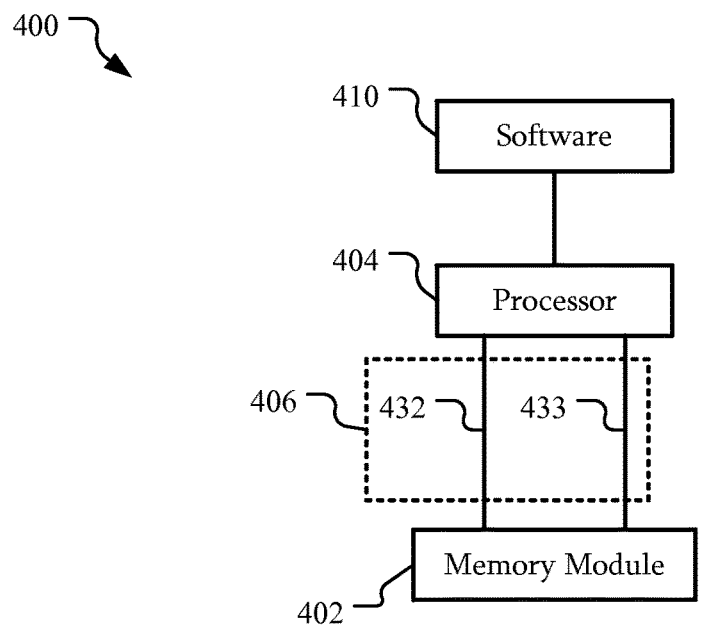
FIG. 4 is a schematic view of a system with a memory system architecture with a poisoned data strobe signal according to an embodiment.

FIG. 4 is a schematic view of a system with a memory system architecture with a poisoned data strobe signal according to an embodiment. In this embodiment, the system 400 includes a memory module 402, a processor 404, memory bus 406 and software 410 similar to the memory module 202, processor 204, memory bus 206, and software 210 of FIG. 2. However, in this embodiment, the memory bus 406 includes data lines 432 and a data strobe line(s) 433. Other lines may be present as part of the memory bus 406; however, for clarity, those lines are not illustrated.

In an embodiment, error information regarding uncorrectable errors and error information regarding correctible errors may be communicated in different manners. As described above, correctible error information may be communicated through a generic memory access, such as through the data lines 432 as part of a read access to the memory module 402. With respect to uncorrectable errors, uncorrectable error information may include a variety of different types of information based on an uncorrectable error. Uncorrectable error information may also be communicated through the memory bus 406. For example, the memory module 402 may be configured to communicate an uncorrectable error by a signal transmitted (or not transmitted) over the data strobe line(s) 433. That is, during a normal data transfer, a data strobe signal transmitted over the data strobe line(s) 433 may toggle as data is transferred; however, if the memory module 402 has detected an uncorrectable error, the memory module 402 may be configured to generate a data strobe signal for transmission over the data strobe line(s) 433 that is different from a data strobe signal during a normal data transfer. In a particular example, the memory module 402 may be configured to not toggle the data strobe signal transmitted through the data strobe line(s) 433. When such a condition is detected, the processor 404 may be configured to generate a hardware exception, which may be handled by the software 410.

While both correctable error information and uncorrectable error information may be transmitted through the memory bus 406, the manner in which the respective error information is transmitted may be different. For example, as described above, a generic read access may be used to read error information from the memory module 406. Thus, correctable error information may use the data lines 432 and the data strobe line(s) 433 with the data strobe line(s) 433 used in a manner similar or identical to the manner in a generic read access. However, communication of an uncorrectable error may be achieved without using the data lines 432, without relying on the data lines 432, or the like. In addition, the data strobe line(s) 433 may be used in a manner different from that in a generic read access. While there may be some overlap, such as the use of data strobe line(s) 433 to transfer data over the data lines 432 when communicating the correctable error information, the manner may still be different.

Although a signal and/or line within the memory bus 406 has been used as an example of a technique to communicate an uncorrectable error, other signals and/or lines may be used to communicate an uncorrectable error to the processor 404. Regardless of how communicated, the processor 404 may be configured to respond to such a communication of an uncorrectable error, such as by halting the system 400 or taking another action.

Figure 5:
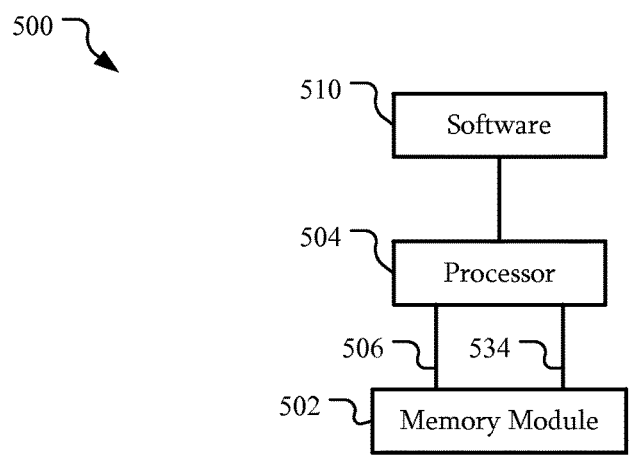
FIG. 5 is a schematic view of a system with a memory system architecture with a separate uncorrectable error signal according to an embodiment.

FIG. 5 is a schematic view of a system with a memory system architecture with a separate uncorrectable error signal according to an embodiment. In this embodiment, the system 500 includes a memory module 502, a processor 504, memory bus 506, and software 510 similar to the memory module 202, processor 204, memory bus 206, and software 210 of FIG. 2. However, in this embodiment, a separate communication path 534 is coupled between the memory module 502 and the processor 504.

Similar to the system 400 of FIG. 4, an uncorrectable error may be communicated to the processor 504. In this embodiment, the memory module 502 is configured to communicate uncorrectable error information over the communication path 534. For example, the communication path 534 may be a dedicated line separate from the memory bus 506. Thus, error information regarding uncorrectable errors may be received by the processor 504, but through a communication path other than the memory bus 506.

Although transmission of uncorrectable error information has been described as being communicated in a manner different from communicating corrected error information, uncorrected error information may also be available in the same manner as the corrected error information.

Figure 6:
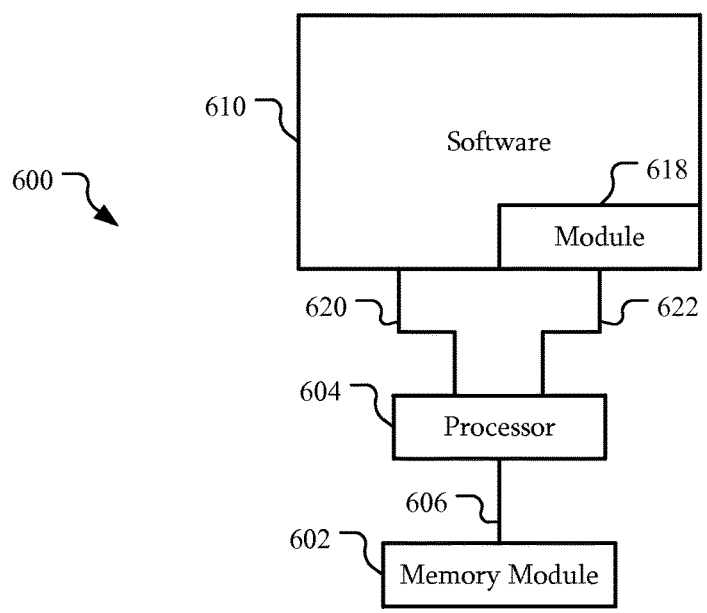
FIG. 6 is a schematic view of a system with a memory system architecture with a software module according to an embodiment.

FIG. 6 is a schematic view of a system with a memory system architecture with a software module according to an embodiment. In this embodiment, the system 600 includes a memory module 602, a processor 604, memory bus 606, and software 610 similar to the memory module 202, processor 204, memory bus 206, and software 210 of FIG. 2. However, in this embodiment, the software 610 includes a module 618.

The module 618 represents a part of the software 610 that is configured to access the error information 622 through access to the reserved address range associated with the memory module 602. As described above, the software 610, including the various software modules described herein, represents the configuration of the processor 604, including the operation and configuration of internal components of the processor 604. For example, the module 618 may include a kernel module, a driver, an extension, or the like. Other information 620 may also be available to the software 610. The error information 622 is illustrated separately to indicate what portion of the software 610 is associated with the error information 622 read from the memory module 602.

In an embodiment, the module 618 may cause the processor 604 to request error information from the memory module 602 by reading from an address within the reserved address range. For example, the memory module 602 may generate error information. At a later time module 618 may cause the processor 604 to transmit a read request to the memory module 602 through the memory bus 606 indicating a read from an address within the reserved address range. In a particular example, the module 618 may cause a memory controller of the processor 604, such as the memory controller 350 of FIG. 3, to activate command and address lines or other similar lines of the memory bus 606 to transmit a read request to the memory module 602. The memory module 602 may be configured to respond to the read request with the error information through the memory bus. For example, the memory controller of the processor 604 may receive the error information as data transited through the memory bus 606 as a response to the read request.

Figure 7:
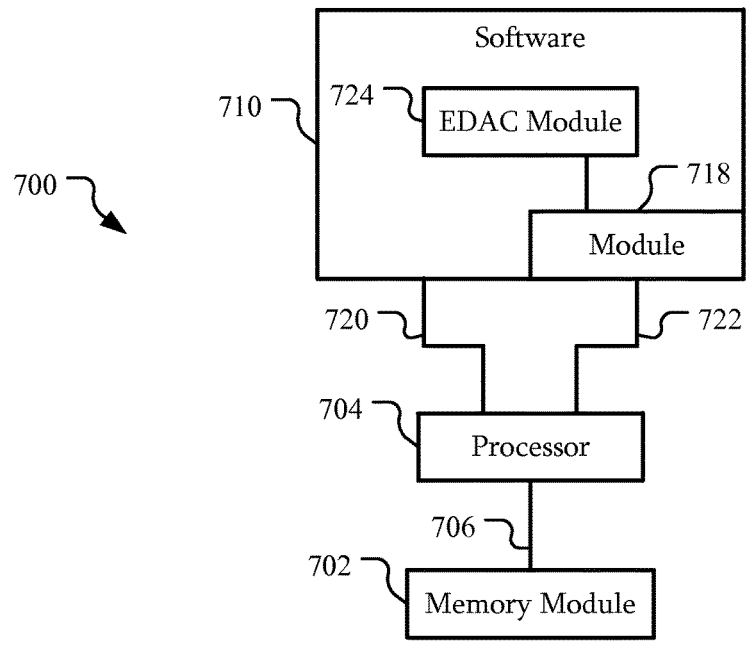
FIG. 7 is a schematic view of a system with a memory system architecture with an error detection and correction module according to an embodiment.

FIG. 7 is a schematic view of a system with a memory system architecture with an error detection and correction module according to an embodiment. In this embodiment, the system 700 includes a memory module 702, a processor 704, memory bus 706, and software 710 with a module 718 responsive to information 720 and 722 similar to the memory module 602, processor 604, memory bus 606, and software 610 with the module 618 responsive to information 620 and 622 of FIG. 6. However, in this embodiment, the software 710 also includes an error detection and correction (EDAC) module 724.

In an embodiment, the EDAC module 724 may be configured to manage error information from memory, caches, input/output (I/O) devices, peripherals, busses, and/or other aspects of the system 700 and may be configured to expose such information to a higher functional layer, such as an application layer. In particular, the EDAC module 724 may be configured to receive the error information from the module 718. The EDAC module 724 may be configured to combine the error information with other information such that other modules, applications, or the like may have access to the error information.

The communication between modules, as described herein, may include reading and writing to system memory. In some embodiments, such communication may include the memory module 702; however, in others, other memory modules may be used. As a particular example, as described above, the module 718 may read from the reserved address range to receive error information. That error information may be stored in the module's 718 local memory space. That is, that same error information may be written back to the memory module 702 or another memory module of the system memory, written to cache memory within the processor 704, or the like. That memory location including the recently stored error information may be stored in a mass storage device (not illustrated), such as a hard disk drive solid state drive, or the like. The EDAC module 724 may be configured to read from the system memory, the mass storage device, or the like to retrieve the error information. Although particular components and techniques have been used as an example, other components, both internal to and external to the processor 704, and other techniques may be used to communicate between modules, including other modules described herein.

Figure 8:
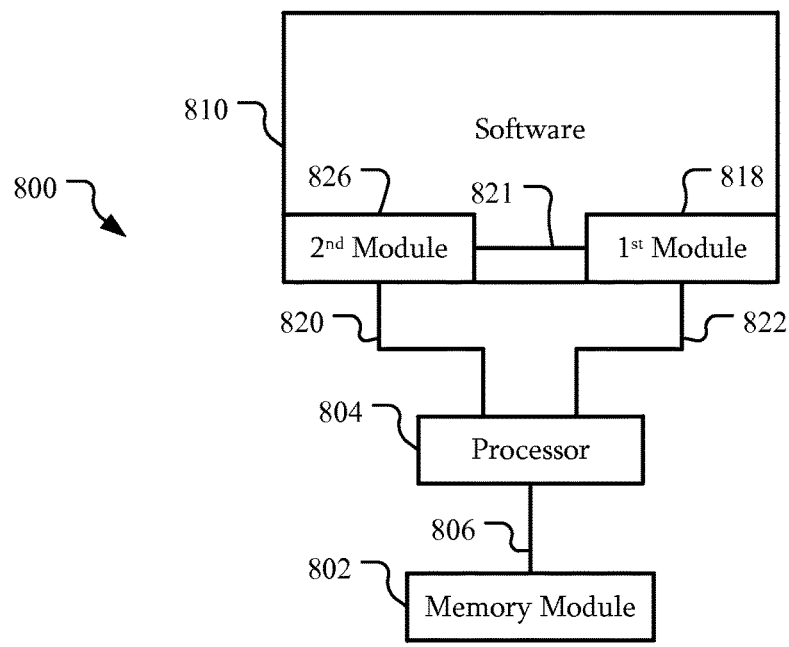
FIG. 8 is a schematic view of a system with a memory system architecture with an aggregating module according to an embodiment.

FIG. 8 is a schematic view of a system with a memory system architecture with an aggregating module according to an embodiment. In this embodiment, the system 800 includes a memory module 802, a processor 804, memory bus 806, and software 810 with a first module 818 responsive to information 820 and 822 similar to the memory module 602, processor 604, memory bus 606, and software 610 with the module 618 responsive to information 620 and 622 of FIG. 6. However, in this embodiment, the software 810 also includes a second module 826. The second module 826 is configured to receive information 820. In particular, this other information 820 may include information unrelated to an error on the memory module 802. For example, the second module 826 may be configured to cause to the processor 804 to exchange information between modules as described above. Internal structures of the processor 804, such as one or more registers, cache memory, or the like, may provide all or part of information 820. In a particular example, the second module 826 may cause the processor 804 to read from a register. At least a part 821 of the other information 820 may be received by the first module 818. The first module 818 may be configured to combine the error information 822 with some or all of the other information 820 from the second module 826. The first module 818 may be configured to present the combined information with a single interface. For example, the first module 818 may be configured to present the combined information to an EDAC module, such as the EDAC module 724 of FIG. 7.

Figure 9:
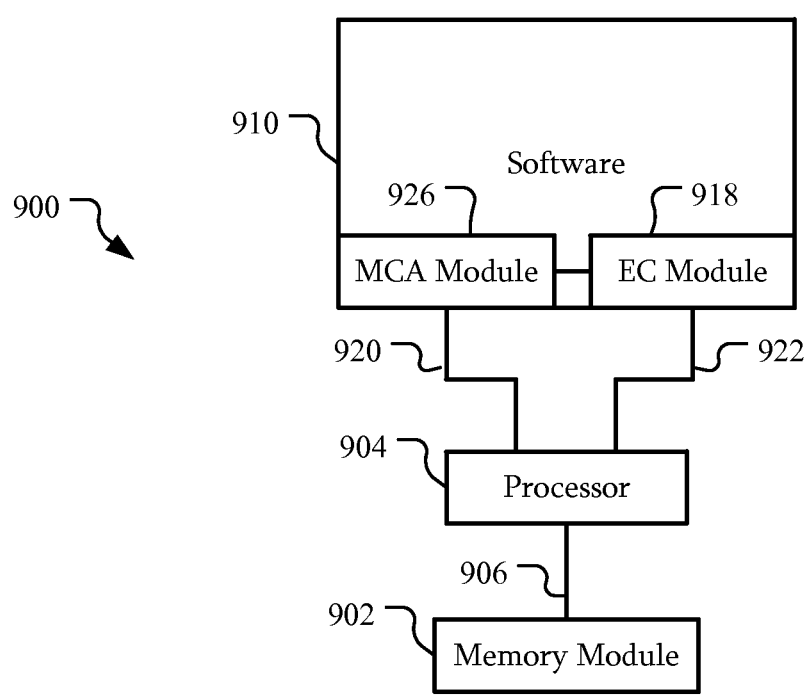
FIG. 9 is a schematic view of a system with a memory system architecture with an error correction module that aggregates information from a memory control architecture module according to an embodiment.

FIG. 9 is a schematic view of a system with a memory system architecture with an error correction module that aggregates information from a memory control architecture module according to an embodiment. In this embodiment, the system 900 includes a memory module 902, a processor 904, memory bus 908, and software 910 with modules 918 and 926 responsive to information 920 and 922 similar to the memory module 802, processor 804, memory bus 806, and software 810 with the modules 818 and 826 responsive to information 820 and 822 of FIG. 8. However, in this embodiment the module 918 is an error correction (EC) module 918 and the second module 926 is an MCA module 926.

The MCA module 926 is configured to control access to MCA registers such as the MCA register 352 of FIG. 3. Information 920 represents such information from the MCA registers. The EC module 918 is configured to access the MCA module 926 to retrieve such information 920. The EC module 918 may combine the information 920 from the MCA module 926 with the error information 922 and present that combined information with a single interface.

For example, the EC module 918 and MCA module 926 may be configured to cause to the processor 804 to exchange information between modules as described above. In addition, internal structures of the processor 904, such as the MCA register 352 of FIG. 3 or other registers, cache memory, or the like, may provide all or part of information 920. In a particular example, the MCA module 926 may cause the processor 804 to read from a register such as the MCA register 352 and the EC module 918 may cause the processor 904 to exchange data from one location in cache memory, system memory, or the like to transfer information from the MCA module 926 to the EC module 918.

In an embodiment, the EC module 918 may present an interface similar to or identical to that of an MCA module 926 had the processor 904 been able to correct errors. For example, if the processor 904 was configured to correct errors in data read from the memory module 902 and such error information was available, that information may be available through the MCA module 926. However, if the processor 904 is not configured to correct errors in data read from the memory module 902 or the processor 904 is configured to correct errors but never receives error information by a communication path monitored by the MCA module 926, due to the errors being corrected in the memory module 902, the MCA module 926 would not be able to present the error information. Regardless, the EC module 918 may combine the MCA module 926 information 920 with error information 922 obtained through read accesses to a reserved address range of the memory module 902 and present that combined information similar to or identical to information that the MCA module 926 would have provided had the processor 904 been configured to correct errors in data read from the memory module 902 or the error information was available to the MCA module 926. Software may then use the same or similar interface regardless of whether a processor 904 with error correction is present. In other words, a processor 904 capable of error correction is not necessary for software relying upon error information to be fully operational. As a result, costs may be reduced by using a less expensive processor 904 without error correction.

Figure 10:
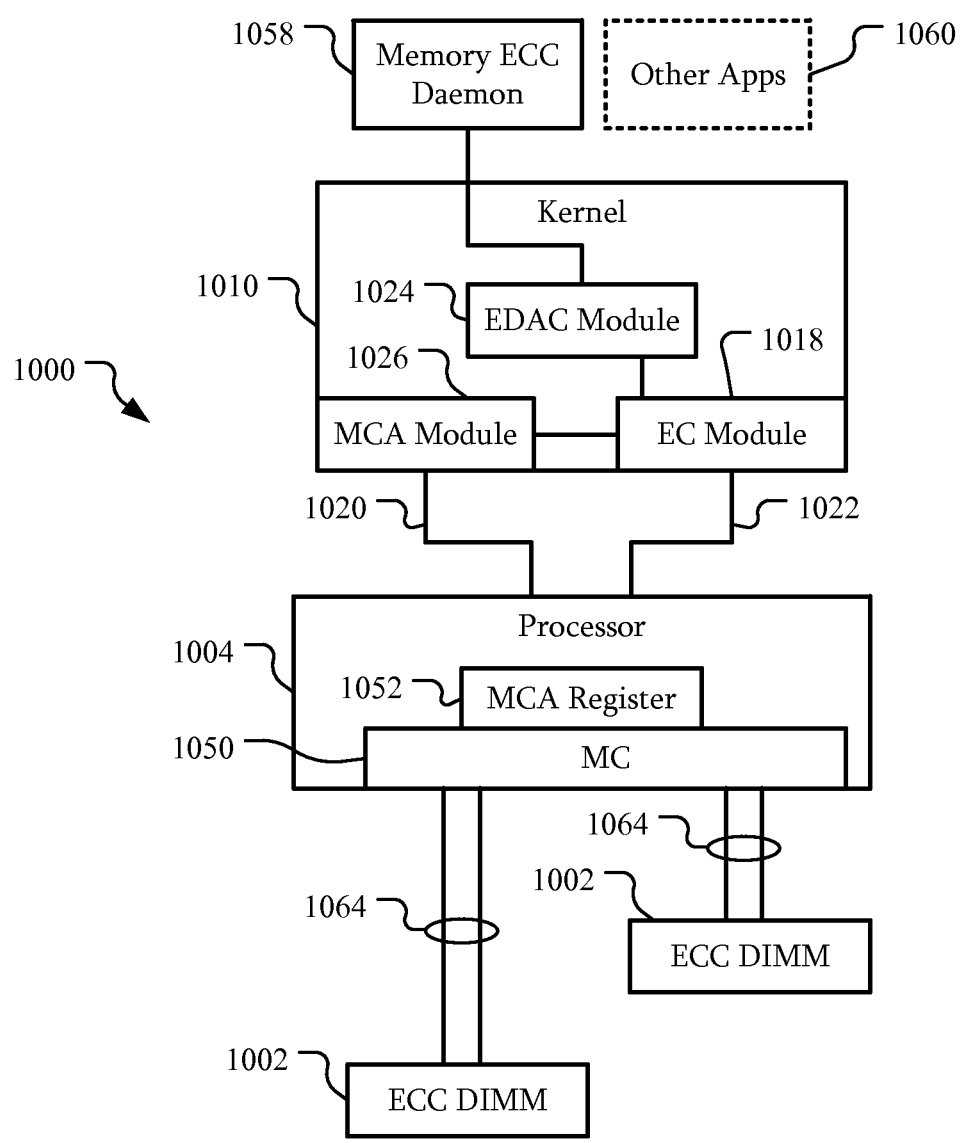
FIG. 10 is a schematic view of a system with a memory system architecture with in-DRAM error correction according to an embodiment.

FIG. 10 is a schematic view of a system with a memory system architecture with in-DRAM error correction according to an example embodiment. In this embodiment, the system 1000 includes memory modules 1002, a processor 1004, kernel 1010 with an EC module 1018 and an MCA module 1026 responsive to information 1020 and 1022 similar to the memory module 902, processor 904, and software 910 with the EC module 918 and MCA module 926 responsive to information 920 and 922 of FIG. 9. In this embodiment, particular modules, operations, or the like are described as being implemented as part of the kernel 1010; however, in other embodiments, those modules, operations, or the like may be implemented by generic software outside of the kernel 1010 or by a combination of such generic software and the kernel 1010. In addition, in this embodiment, each of the memory modules 1002 is an error correction code (ECC) dual in-line memory module (DIMM). Each ECC DIMM 1002 is configured to store data and correct at least an error in the stored data. In this embodiment, the ECC DIMMs 1002 are each coupled to a memory controller (MC) 1050 of the processor 1004 through corresponding memory busses 1064. The memory busses 1064 include at least lines for data signals and data strobe signals or the like similar to the memory bus 406 of FIG. 4.

In an embodiment, the ECC DIMMs 1002 may be configured to correct one or more errors in data read from the ECC DIMMs 1002. The error correction techniques may include a single error correction-double error detection (SEC-DEC) technique, a single-chip chipkill technique, a double-chip chipkill technique, or the like. Any error correction technique may be used.

In this embodiment, the memory controller (MC) 1050 is not configured to perform error correction or alternatively, is not configured to retrieve error information from the ECC DIMMs 1002 other than as operating as part of a generic read access to the ECC DIMMs 1002. As the data passed from the ECC DIMMs 1002 is already corrected, the MC 1050 may not even receive any information representing a correctible error. However, the error information and, in particular, corrected error information may be transmitted to the processor 1004 through a read access to a reserved memory range as described above.

In an embodiment, the processor 1004 may be an existing processor that is otherwise not capable of performing error correction. However, once the processor 1004 is configured by the kernel 1010 and, in particular, the EC module 1018, the overall system 1000 may be configured to perform error correction similar to a system having a processor capable of error correction.

In an embodiment, the EC module 1018 may create a virtual memory controller with an ECC interface. For example, as described above, the EC module 1018 may be configured to receive information from the MCA module 1026. That information may be the information that an actual memory controller with an ECC interface may provide, without some or all error information. The EC module 1018 may supplement the information from the MCA module 1026 with the error information to create a complete set of information expected from a memory controller with ECC interface. As a result, the EDAC module 1024, a memory ECC daemon 1058, other applications 1060, or the like may be used without change from those used with processors with error correction. For example, the EDAC module 1024 may be configured to poll the EC module 1018 for memory ECC information. In return, the EC module 1018 may return the error information received by reading from the reserved address range of one or more of the ECC DIMMs 1002. In some embodiments, the EC module 1018 may poll one or more of the ECC DIMMs 1002 such that the error information is available when the EC module 1018 is accessed. The memory ECC daemon 1058, in communication with the EDAC module 1024, may poll the EDAC module 1024 for error information. The memory ECC daemon 1058 may then take actions according to the error information at an application level. Such actions may include page retirement, other actions to manage errors to keep the system 1000 running, maintain a level of reliability, recommend decommissioning, or the like.

As described above, an uncorrectable error may be detected. The uncorrectable error information may be communicated through the MC 1050, MCA register 1052, and MCA module 1026 to the EC module 1018. For example, an uncorrectable error may be communicated by a non-maskable interrupt, exception, or the like through the MCA module 1026. In a particular example, the memory controller 1050 may generate a hardware exception in response to an uncorrectable error, regardless of how communicated to the memory controller 1050. The MCA module 1026 may intercept that exception and pass it to the EC module 1018. The EC module 1018 may then communicate the exception to the EDAC module 1024. In addition to or instead of communicating uncorrectable error information as described above, uncorrectable error information may be communicated through read accesses to reserved address ranges of the ECC DIMMs 1002.

In an embodiment, the ECC DIMMs 1002 may be configured to provide corrected data to the processor 1004. However, the data may become corrupted between the ECC DIMMs 1002 and the MC 1050. Accordingly, some form of error correction may be performed between the ECC DIMMs 1002 and the processor 1004 or MC 1050. For example, the data transmitted from the ECC DIMMs 1002 may be encoded with error correction codes intended to detect errors that occur over the communication link 1064. With such error correction, substantially the entire path from storage elements in the ECC DIMMs 1002 to the processor may be protected with error correction.

Figure 11A:
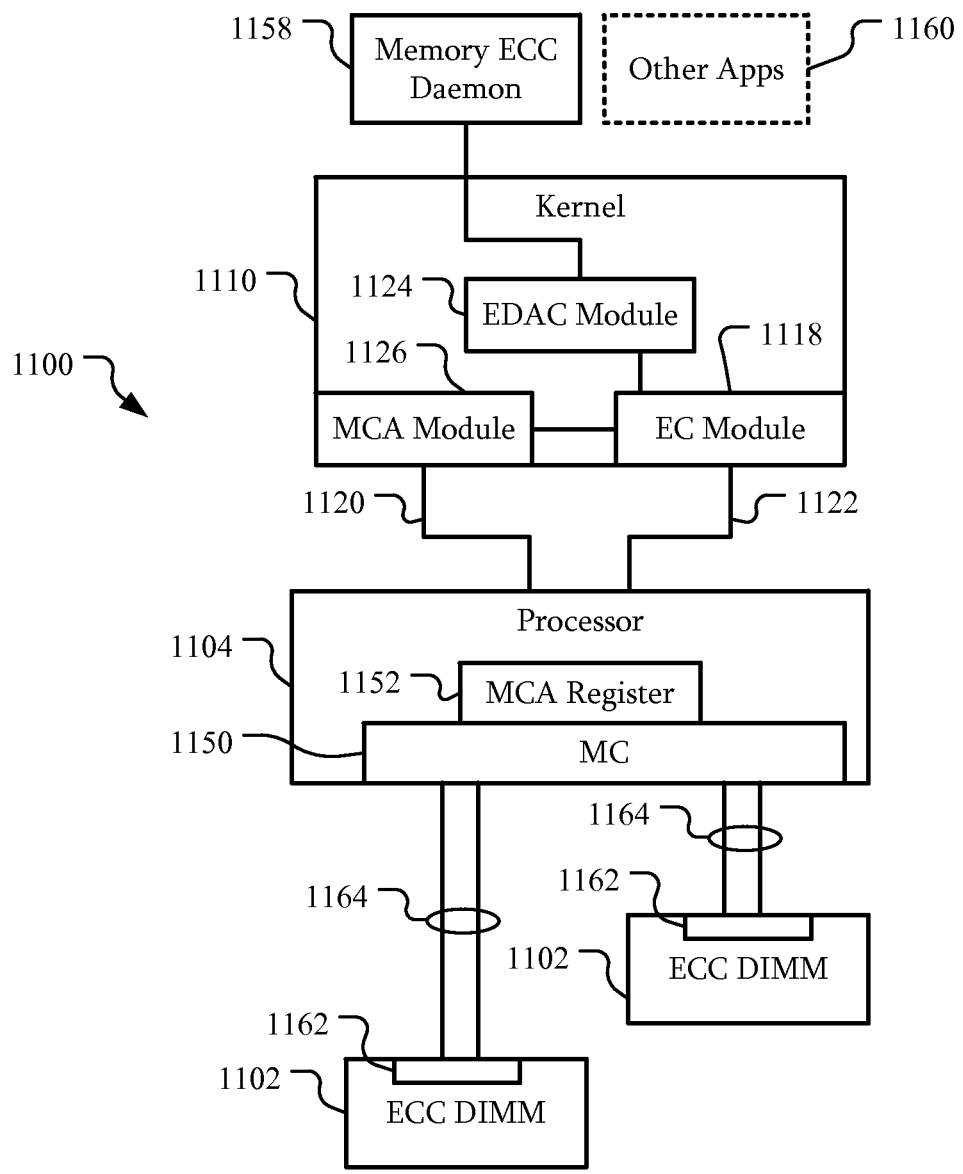
FIGS. 11A-D are schematic views of systems with a memory system architecture with in-module error correction according to some embodiments.

FIGS. 11A-D are schematic views of systems with a memory system architecture with in-module error correction according to some embodiments. Referring to FIG. 11A, the system 1100 includes components similar to those of FIG. 10; however, in this embodiment, the ECC DIMMs 1102 include a buffer 1162. The buffer 1162 is configured to correct errors in data read from the corresponding ECC DIMM 1102. In particular, uncorrected data may be read from internal memory devices, such as DRAM devices (not illustrated) of the ECC DIMM 1102. The buffer 1162 may be configured to correct the uncorrected data and generate corrected error information similar to other memories described herein. For example, the buffer 1162 may include an error correction circuit, registers, and other components. A register may store data read from the ECC DIMMs 1102. The error correction circuit may include logic circuit that may identify an error in the data read from the ECC DIMMs 1102, such as by comparing bits of the data in the registers according to an error correction technique. In addition, the logic circuit may correct the error so that when the data is read from the register, the data is corrected. In addition, the logic circuit may store error information about that error in another register or other data storage device within the buffer 1162. That error information may be read by the processor 1104 by a read access to an address within a reserved address range and may be used as described above. That is, the error information may be used as described above regardless of how the error information is generated.

Figure 11B:
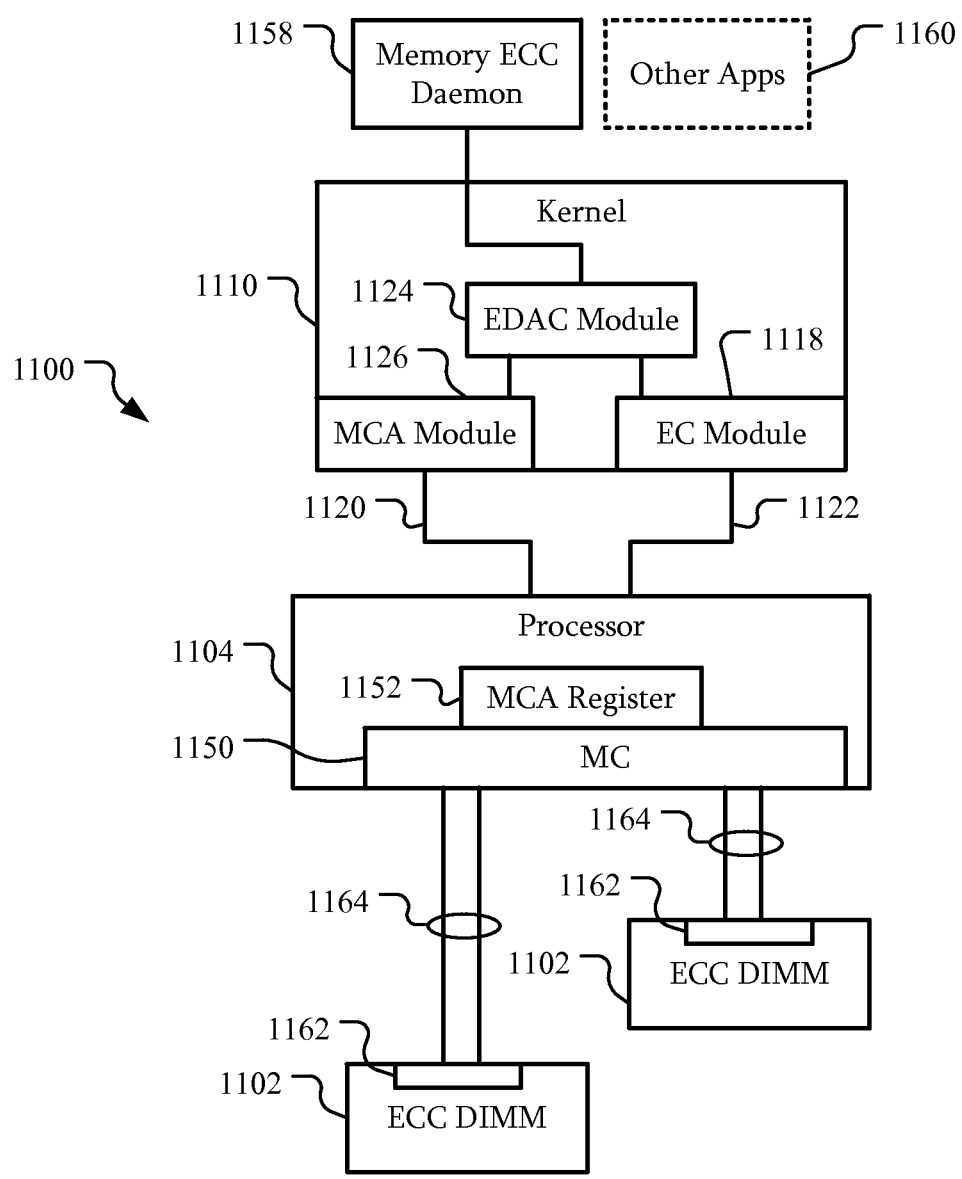

Referring to FIG. 11B, the components of the system 1100 may be similar to those of FIG. 11A. However, in this embodiment, the EDAC module 1124 is configured to communicate with the MCA module 1126. For example, the EDAC module 1124 may be configured to poll the MCA module 1126 for hardware related information, uncorrectable error information, or other information available through the MCA module 1126 as described above. The EDAC module 1124 may be configured to combine the information from the MCA module 1126 with information from the EC module 1118. For example, the EDAC module 1124 may cause the processor 1104 to transmit or exchange information as described above with respect to communication between modules.

Figure 11C:
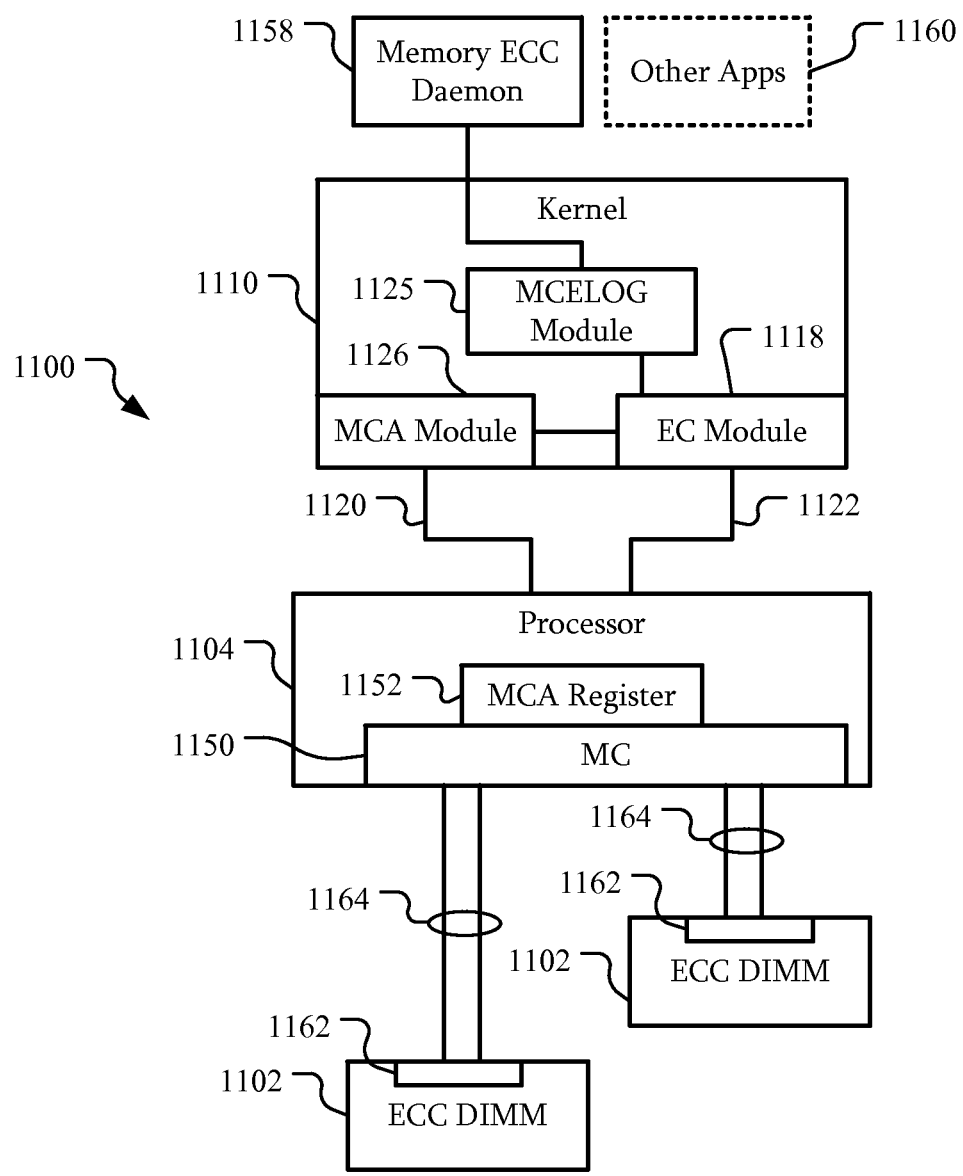

Referring to FIG. 11C, the components of the system 1100 may be similar to those similar to those of FIG. 11A. However, in this embodiment, an MCELOG module 1125 is configured to receive information from the CE module 1118. The MCELOG module 1125 may be configured to record machine check events (MCEs) related to various system errors, such as memory errors, data transfer errors, or other errors. The MCELOG module 1125 may be configured to raise an interrupt to the Memory ECC Daemon 1158 and pass error information to the Memory ECC Daemon 1158. For example, the MCELOG module 1125 may cause the processor 1104 to transmit or exchange information as described above with respect to communication between modules. If some error is detected the MCEDLOG module 1125 may be configured to cause the processor 1104 to raise an interrupt. The Memory ECC Daemon 1158 may cause the processor 1104 to detect such an interrupt and cause information associated with the MCELOG module 1125 to transmit or exchange information with the Memory ECC Daemon 1158.

Figure 11D:
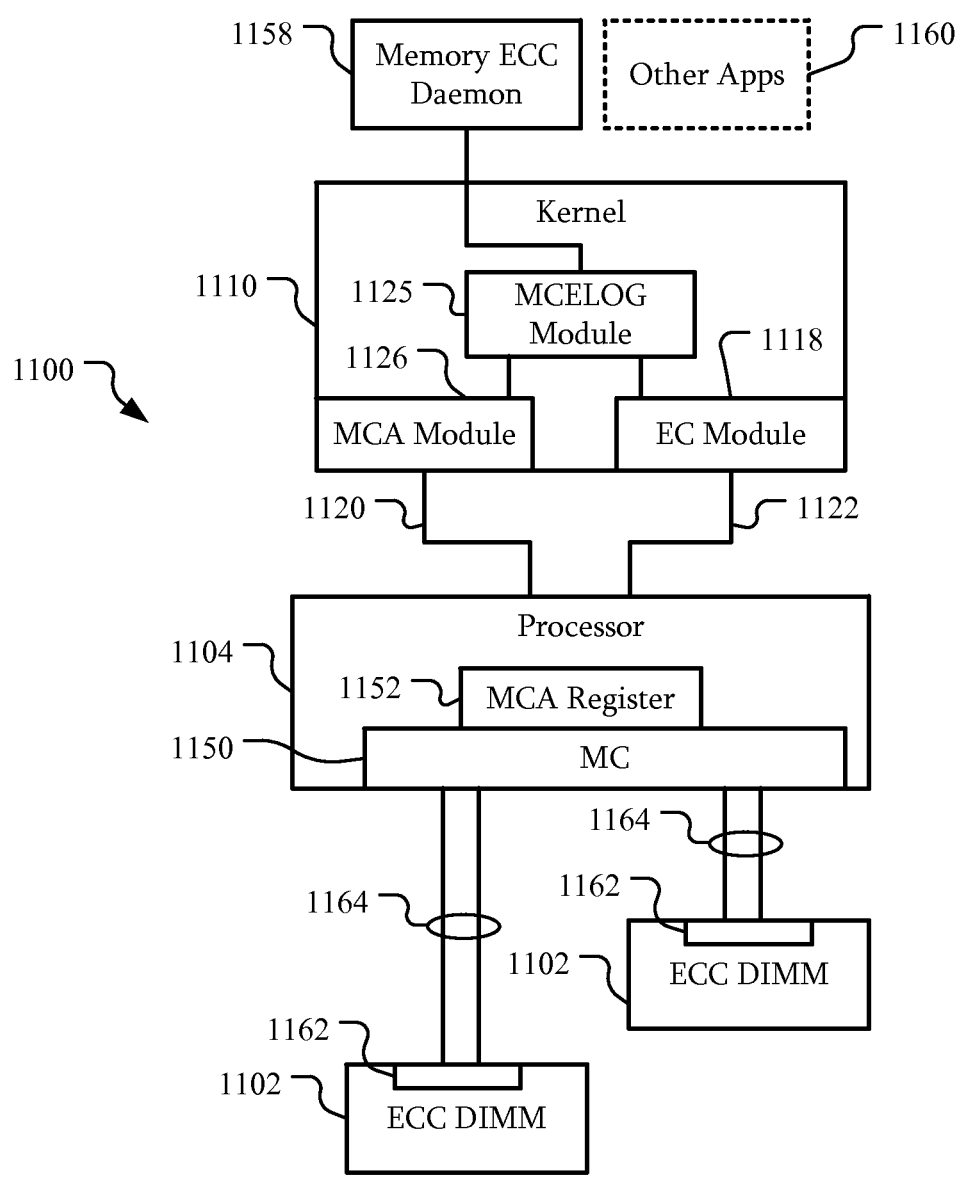

Referring to FIG. 11D, the components of the system 1100 may be similar to those of FIG. 11C. However, in this embodiment, similar to the difference between FIGS. 11A and 11B, the MCELOG module 1125 may be configured to receive information from the MCA module 1126 similar to the EDAC module 1124 of FIG. 11B.

Although different modules have been described with respect to ECC DIMMs 1102 with buffers 1162 in FIGS. 11A-D, in other embodiments, the various configurations may be applied to the system 1000 of FIG. 10 with ECC DIMMs 1002.

Figure 12A:
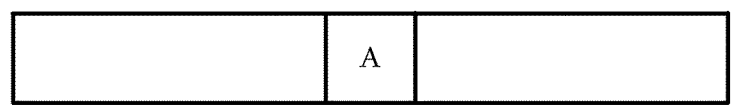
FIGS. 12A-D are schematic views of memory address space according to various embodiments.

FIGS. 12A-D are schematic views of memory address space according to various embodiments. Referring to FIG. 12A, in this embodiment, memory address space available to a processor, and hence, available to the operating system, modules, or the like is represented by memory address space 1200*a*. An address range A has been reserved in the memory address space 1200*a*. As an example, the address range A may have a size of a single byte. A read from the address range A may return a single byte. Alternatively, multiple successive read accesses may produce multiple bytes, a stream of bytes, or the like. As described above, the value of that byte or series of bytes may include at least part of meta-data associated with a device. In addition, a single byte command may be written by a write access to the single byte address range. Alternatively, a multi-byte command may be written to the single byte address range through successive writes.

Although a single byte has been used as an example of a size of the address range A, the address range may have a different size. For example, the address range A may be a nibble, a word, any unit of data, or a series of units of data accessible by a processor. Moreover, although a particular technique of reading and writing meta-data and commands has been given as an example, other techniques may be used.

Figure 12B:
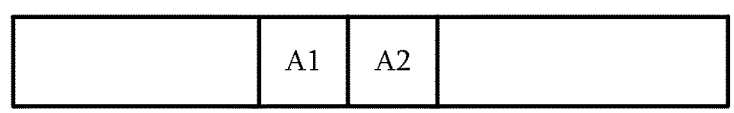

Referring to FIG. 12B, in memory address space 1200b, a reserved address range may include address ranges A1 and A2. In an embodiment, address range A1 may be used for reading meta-data from a device as described above. Address range A2 may be used for writing commands to a device as described above.

Figure 12C:
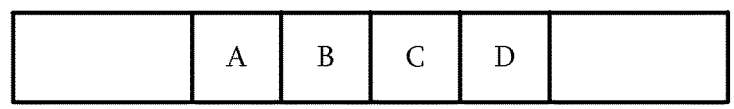

Referring to FIG. 12C, in memory address space 1200c, multiple address ranges may be reserved. In an embodiment, reserved address ranges A, B, C, and D are associated with different devices. For example, four devices may be coupled to a processor through a memory bus. Reserved address ranges A, B, C, and D may have a one-to-one correspondence to those devices. Thus, to read meta-data from a first device, the processor may perform a read access to address range A. To read meta-data from a second, third, or fourth device, the processor may perform a read access to address range B, C, or D, respectively. Similar to FIG. 12A, write accesses to the address ranges A, B, C, and D may be used to transmit commands to the respective devices.

Figure 12D:
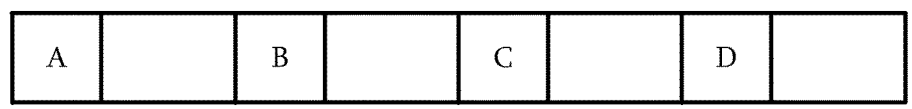

Referring to FIG. 12D, similar to FIG. 12C, in memory address space 1200d, multiple address ranges A, B, C, and D may be reserved. However, in this embodiment, the address ranges A, B, C, and D may not be contiguous. For example, in a particular embodiment, each of multiple memory modules may correspond to a different segment of the memory address space 1200d. The reserved address range for a given memory module may be reserved within the address range associated with that memory module.

Although various combinations and variations on location, size, correspondence, or the like of reserved address ranges have been used as examples, any such relationship may be formed such that for a given association of an address range and a device, a write or read access to or from the address range is directed towards the particular device.

Figure 13:
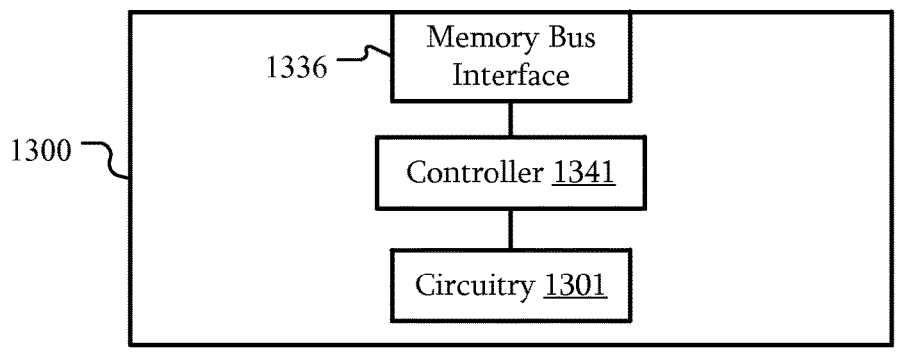
FIG. 13 is a schematic view of a device according to an embodiment.

FIG. 13 is a schematic view of a device according to an embodiment. In this embodiment, a device 1300 includes a memory bus interface 1336. The memory bus interface 1336 is configured to be coupled to a memory bus such as those described above. For example, the memory bus interface 1336 may include buffers, drive circuits, terminations, or other circuits for lines such as data lines, strobe lines, address lines, enable lines, clock lines, or the like. For example, the various lines may be coupled to the various buffers, drive circuits, and terminations. Thus, signals that are received over the lines may be buffered and used within the device 1300 and similarly, the drive circuits may output signals over the various lines. Terminations may terminate the various lines to reduce reflections. In a particular example, the memory bus interface 1336 may include a double data rate synchronous dynamic random-access memory (DDR SDRAM) interface, a variation of such an interface, or other similar interfaces.

The device 1300 also includes circuitry 1301. The circuitry 1301 may be any circuitry according to the particular device 1300. As will be described in further detail below, the circuitry 1301 may include memory devices; however, in other embodiments, other types of devices may be included in the circuitry 1301.

The device 1300 also includes a controller 1341. The controller 1341 may be a general purpose processor, a digital signal processor (DSP), an application specific integrated circuit, a microcontroller, a programmable logic device, state machine, discrete circuits, a combination of such components, or the like. The controller 1341 may be coupled to the memory bus interface 1336 and the circuitry 1301. In some embodiments, the controller 1341 may include the memory bus interface 1336.

In an embodiment, the controller 1341 may be configured to collect meta-data associated with the circuitry 1301. For example, the controller 1341 may include various interfaces for sensors that are part of the circuitry 1301. In a particular example, the device may include a temperature sensor with an Inter-Integrated Circuit (I2C) interface. The temperature sensor may indicate the operating temperature of other portions of the circuitry 1301. The controller 1341 may also include an I2C interface with which it may request and receive temperature information from the temperature sensor. In another example, the controller 1341 may include internal components that may monitor the controller's 1341 status and/or the status of data passing through the controller 1341. The controller 1341 may be configured to access these components and add information to the meta-data in response.

In addition, the controller 1341 may be configured to enable access to the meta-data in response to a memory access received through the memory bus interface 1336. For example, as described above, the device 1300 may be configured to expose at least a part of the meta-data in response to a read access. Accordingly, the controller 1341 may be configured to receive a read access through the memory bus interface 1336 associated with a predetermined address range. The controller 1341 is configured to respond to that read access through the memory bus interface 1336 based on the meta-data. Similarly, the controller 1341 may be configured to receive a write access through the memory bus interface 1336 associated with the predetermined address range and adjust collection of the meta-data based on data associated with the write access. In a particular example, the controller 1341 may receive data from the memory bus interface 1336 indicating that the device 1300 has received a read access. In response, the controller 1341 may compare an address received from the memory bus interface 1336 as part of the read access to the predetermined address range, such as by comparing the received address to an internal register, look-up table, or other component storing the predetermined address range. The controller 1341 may then read meta-data from a register storing the meta-data and transmit that meta-data through the memory bus interface 1336.

Figure 14A:
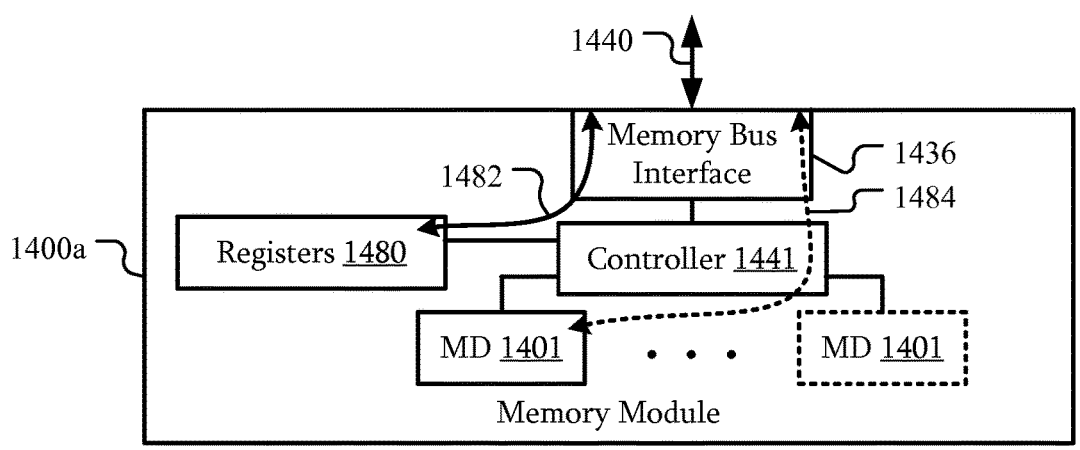
FIGS. 14A-C are a schematic view of memory modules according to various embodiments.
Figure 14B:
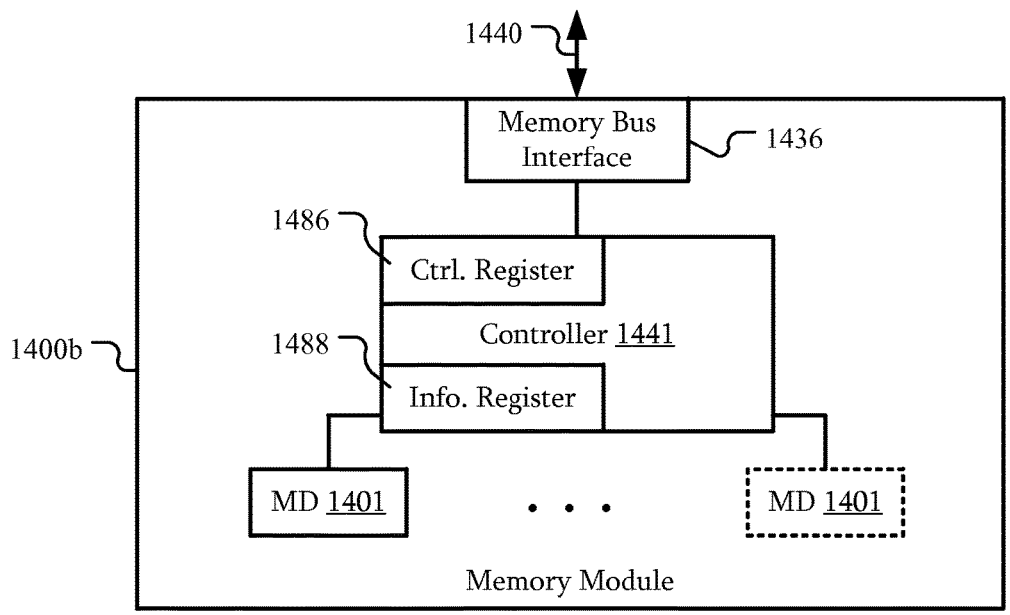
Figure 14C:
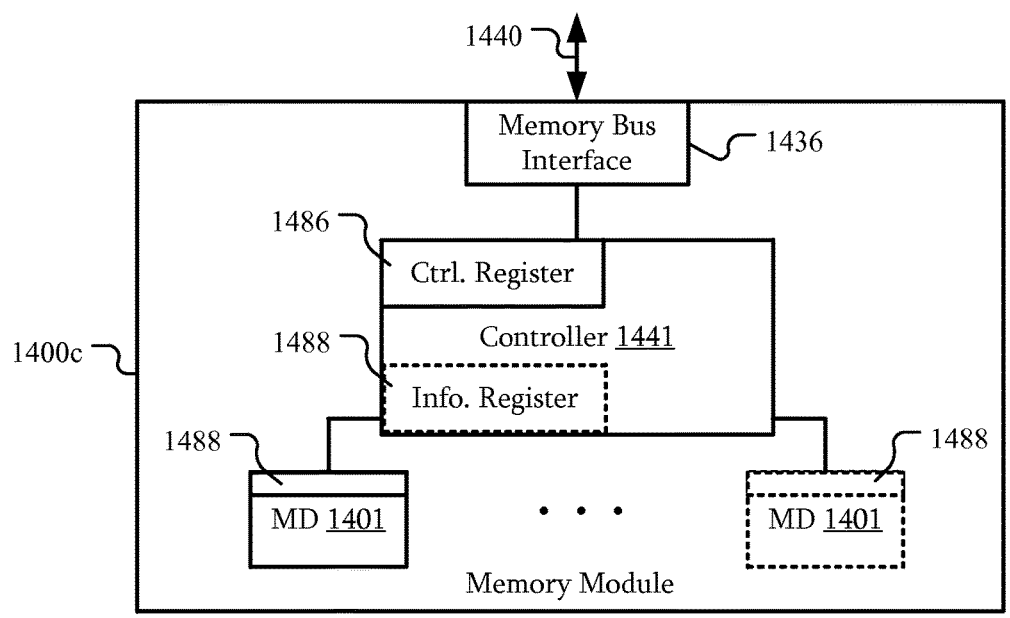

FIGS. 14A-C are a schematic view of memory modules according to various embodiments. Referring to FIG. 14A, the memory module 1400a is similar to the device 1300 of FIG. 13. However, the memory module 1400a includes one or more memory devices (MD) 1401 as the circuitry 1301. For example, the memory devices 1401 may include SRAM, DRAM, non-volatile memory such as Flash, STT-MRAM, or Phase-Change RAM, or the like.

The memory module 1400a is configured to transmit and receive data 1440 over the memory bus 1436. Data may be stored in the memory devices 1401. The memory bus 1436 may be the interface through which data stored in the memory devices 1401 is transmitted and the interface through which data 1440 to be stored in the memory devices 1401 is received.

The controller 1441 may be any device or circuit configured to be operatively coupled to the memory devices 1401. For example, the controller 1441 may be coupled to data, address, and control lines coupled to the memory device 1401. By communicating with the memory devices 1401 over such lines, the controller 1441 may be configured to facilitate a transfer of data to/from the memory devices 1401 in/out of the memory module 1400*a*. The controller 1441 may include a buffer, such as an RCD, or the like. The controller 1441 is coupled to the memory devices 1401, and the memory bus 1436. Accordingly, the controller 1441 may be configured to receive data from the memory devices 1401 and buffer that data in a buffer or register. That data may then be communicated by the controller 1441 through the memory bus interface 1436. Write data may be similarly processed in the reverse order.

The memory module 1400*a* may be configured to generate error information for data read from the one or more memory devices 1401. For example, the controller 1441 may be configured to collect device error information from the memory devices 1401 and generate the meta-data in response to the device error information from the memory devices 1401. For example, each memory device 1401 may include its own error correction circuit. The error correction circuit may receive data from internal data storage, such as memory cells. If an error exists in data read from the internal data storage, the error correction circuit may correct one or more errors in that data and generate error information. That error information may be stored in a register of the memory device 1401 as the device error information. The controller 1441 may communicate with the memory devices 1401 to receive the device error information.

In another example, the controller may be configured to generate the error information based on correction of data read from the memory devices 1401. For example, the controller 1441 may include an error correction circuit, registers, and other components. A register may store data read from the memory devices 1401. The error correction circuit may include logic circuit that may identify an error in the data read from the memory devices 1401. In addition, the logic circuit may correct the error so that when the data is read from the register, the data is corrected. In addition, the logic circuit may store error information about that error in another register or other data storage device within the controller 1441.

The controller 1441 is coupled to registers 1480. In some embodiments, the registers 1480 may be part of the controller 1441. In other embodiments, the registers 1480 may be separate from the controller 1441. In some embodiments, registers may be divided between the controller 1441 and the memory devices 1401. Regardless, the controller 1441 may be configured to store meta-data and/or data from which the meta-data may be generated in the registered 1480. For example, when device error information is received from the memory devices 1401, the controller 1441 may be configured to aggregate that device error information and store the aggregated information in one or more of the registers 1480.

As described above, the meta-data associated with the memory module 1400*a* may include error information associated with the memory devices. Although information related to errors may be the only meta-data available, in other embodiments, other meta-data, such as temperature, power consumption, refresh information, or the like may also be part of the meta-data. For example, as described above, the controller 1441 may be coupled to other circuitry, such as various sensors. The controller 1441 may communicate with these sensors and add their meta-data to the existing meta-data.

Two accesses 1482 and 1484 through the memory bus interface 1436 are illustrated in FIG. 14A. Accesses 1482 and 1484 are illustrated with different line styles to highlight the different processing of the accesses 1482 and 1484. Access 1484 is an access to an address that is not reserved as described above. Accordingly, the controller 1441 is configured to direct that access 1484 to an appropriate memory device or devices 1401. In contrast, access 1482 is an access to an address within a reserved address range. The controller 1441 may be configured to direct that access 1482 to register 1480.

Access to the register 1480 is merely used as an example of how the controller 1441 may direct the access 1482. For example, in other embodiments, the controller 1441 may be configured to generate a response to the read access rather than directing the access to the registers 1480.

In an embodiment, a read access may be handled differently from a write access. For example, the controller 1441 may be configured to direct a read access to read from a register 1480. However, the controller 1441 may be configured to direct a write access to a different register 1480. In some embodiments, the controller 1441 may not access the registers 1480 when responding to a write request. For example, the controller 1441 may be configured to change a configuration of the controller 1441, change a configuration of a memory device 1401, or the like. Such configurations may be related to error correction information and/or may be related to other meta-data systems within the memory module 1400*a*.

In an embodiment the controller 1441 may be configured to communicate an uncorrectable error through the memory bus interface 1436. For example, as described above, a data strobe signal transmitted from a memory module 1400*a* over one or more data strobe lines may be used to indicate an uncorrectable error. The controller 1441 may be configured to modify the data strobe signal transmitted through the memory bus 1436 in response to detecting an uncorrectable error.

Referring to FIG. 14B, the memory module 1400*b* may be similar to the memory module 1400*a* of FIG. 14A. However, the controller 1441 may include a control register 1486 and an information register 1488. The control register 1486 may be a register that is used to store data, such as configuration information, used in controlling the collection of error information or other meta-data. For example, a write command to an address within the reserved address range may write to the control register 1486.

The information register 1488 may be a register that includes error information and/or other meta-data associated with the memory module 1400*b*. When a read request is received the response may read from the information register 1488.

Referring to FIG. 14C, the memory module 1400*c* may be similar to the memory module 1400*b* of FIG. 14C. However, in this embodiment, the information register 1488 is disposed in the memory device 1401. In particular, if multiple memory devices 1401 are present, each may have a corresponding information register 1488. The information register 1488 of a particular memory device 1401 may be configured to contain the error information and/or meta-data associated with that memory device 1401. As described above with respect to FIG. 14A, the controller 1441 may be configured to access the information register(s) 1488 when responding to a read request within the reserved address range as described herein.

In some embodiments, the controller 1441 may include its own information register 1488. Accordingly, the controller 1441 may be configured to store meta-data for the memory module 1400c that extends beyond the meta-data for individual memory devices 1401.

While a single control register 1486 and a single information register 1488 have been used as examples, any number of such registers may be present. For example, multiple information registers 1488 may be present in various locations to store various types of meta-data. In another example, multiple control registers 1486 may be present in various locations to control the collection of such meta-data.

Figure 15:
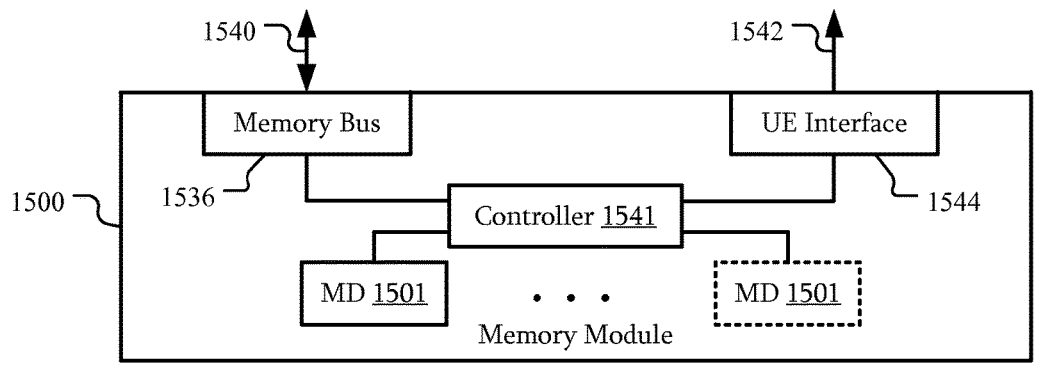
FIG. 15 is a schematic view of a memory module with a separate uncorrectable error interface according to an embodiment.

FIG. 15 is a schematic view of a memory module with a separate uncorrectable error interface according to an embodiment. In this embodiment, the memory module 1500 includes one or more memory devices 1501, a memory bus 1536, and a controller 1541 similar to the one or more memory devices 1401, the memory bus 1436, and the controller 1441 of FIG. 14. However, the memory module 1500 also includes an uncorrectable error (UE) interface 1544. The UE interface 1544 is a separate interface through which the memory module 1500 is configured to communicate uncorrectable errors. For example, the UE interface 1544 may be a dedicated line, a dedicated bus, or the like.

Figure 16:
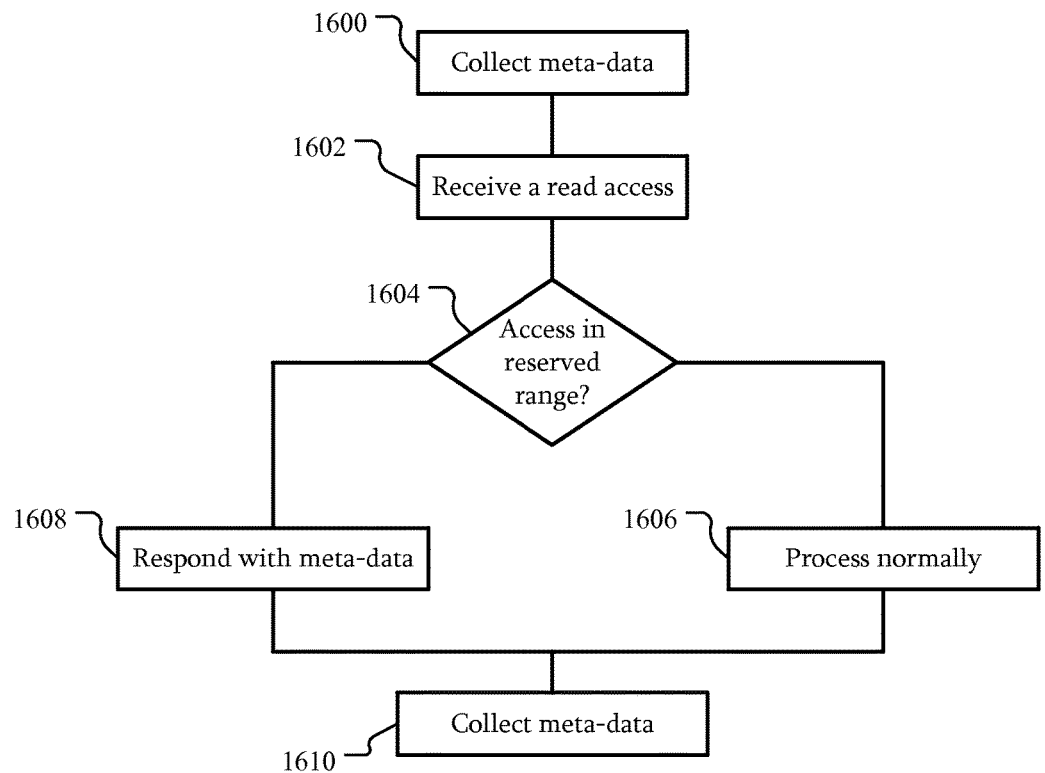
FIG. 16 is a flowchart of a technique of responding to a read access according to an embodiment.

FIG. 16 is a flowchart of a technique of responding to a read access according to an embodiment. In this embodiment, meta-data associated with a device is collected in 1600. The meta-data may be any meta-data as described above; however, in some embodiments, the meta-data is error information associated with memory devices of the device. In one example, the collection of meta-data in 1600 may include collecting device error information from the memory devices and generating the meta-data in response to the device error information from the memory devices.

In an embodiment, the collection of meta-data in 1600 may be an ongoing process. For example, components of the device may be configured to monitor various activities, statues, conditions, or the like of the device. Such components may include temperature sensors, refresh control systems, error correction systems, or the like. Such components may be coupled to a controller as described above. The controller may communicate with these components to receive meta-data from the components. In addition, a controller may also collect meta-data about itself, its operations, or the like. This meta-data may be stored by the controller in a register or other storage device. The device may periodically, continuously, or sporadically compile the meta-data or compile the meta-data when desired. That meta-data may then be available for access through the device.

In 1602 a read access is received by the device through a memory bus interface. In 1604, the device determines if the read access is directed towards a reserved address range. For example, as described above, a controller of the device may compare an address received through a memory bus interface to a predetermined address. If the read access is not directed towards the reserved address range, the read access is processed normally in 1606. For example, a controller of the device may read data from memory devices of the device. The controller may then respond to the read access through a memory bus interface.

However, if the read access is directed towards the reserved address range, the device responds through the memory bus interface to the read access with data including at least part of the meta-data in 1608. For example, the controller may read meta-data from a register. The controller may then transmit that meta-data through the memory bus interface. Alternatively, the controller may further process the meta-data, such as by combining the meta-data from multiple registers, and transmit that processed meta-data through the memory bus interface. In some embodiments, after responding to the read access, the device may continue to collect meta-data in 1610 similar to the collection in 1600.

In a particular embodiment, where the meta-data includes error information, the normal processing in 1606 may be part of the generation of meta-data. For example, when responding to read accesses from memory devices of a memory module and in particular, when correcting read data, error information may be generated. For example, a controller may correct data read from memory devices and generate error information during normal read accesses. In another example, the memory devices may correct errors in the data and generate error information during normal read accesses. That error information may be collected and included in the meta-data, used to generate the meta-data, or the like.

In a particular example, a read error when reading data from a memory device may occur during the normal processing in 1606. In response, error information may be generated. For example, a read error may include a correctable error that was corrected. The error information may include information about that correctable error. In another example, the read error may be multiple errors. The error information may be information about those errors. However, if an error has not occurred, the error information may reflect the lack of errors. The response to the read access to the reserved address range with meta-data in 1608, as described above, may include such error information in whole or in part.

Figure 17:
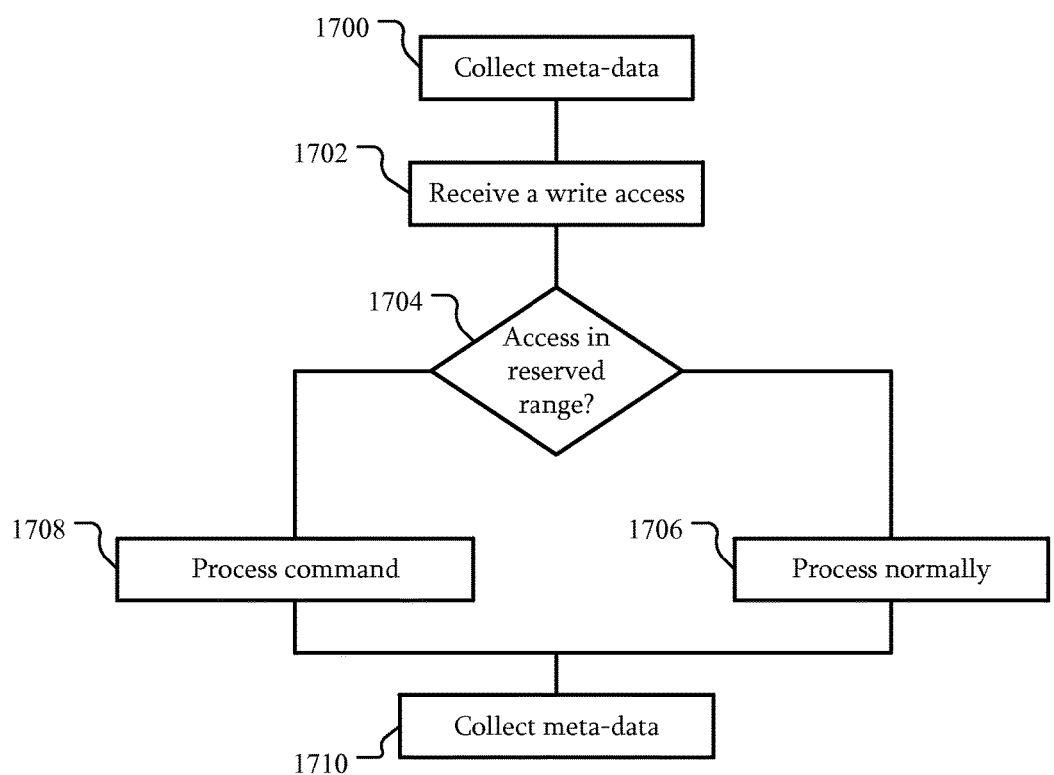
FIG. 17 is a flowchart of a technique of responding to a write access according to an embodiment.

FIG. 17 is a flowchart of a technique of responding to a write access according to an embodiment. In this embodiment, the collection of meta-data in 1700 may be performed by a device in a manner similar to the collection in 1600 of FIG. 16. However, in this embodiment, a write access is received by the device in 1702. In 1704, the device determines whether the write access is associated with a reserved address range. This determination may be similar to the determination in 1604 of FIG. 16. If not, the device processes the write access normally in 1706, for example, by writing write data to memory devices of the device. In a particular example, a controller of the device may receive the data to be written. The controller may then write the data to memory devices of the device.

If the write access is associated with a reserved address range, in 1708, a command within the write access may be processed by the device. For example, the controller of the device may adjust the collection of meta-data, such as by starting or stopping collection, instructing memory devices to adjust their meta-data collection, adjusting how meta-data is aggregated by the controller, or the like. Afterwards, the collection of meta-data may continue in 1710 similar to that in 1700; however, the operation may be different. For example, the controller may collect meta-data differently, the controller may collect different types of meta-data, the controller may aggregate meta-data from other components of the device differently, the memory devices of the device may collect meta-data differently, or the like.

Figure 18:
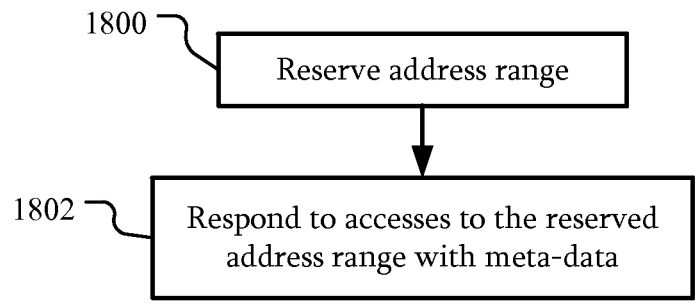
FIG. 18 is a flowchart of a technique of reserving an address range according to an embodiment.

FIG. 18 is a flowchart of a technique of reserving an address range according to an embodiment. In this embodiment, in 1800, an address range is reserved within a device. For example, the device and another accessing device, such as a processor, may negotiate to establish an address range to reserve. In another embodiment, an external pin or pins of the device may be used to determine the reserved address range. For example, a system may include multiple sockets for devices. Each socket for a device may have particular pins tied to particular logic values that are unique among the sockets. In response to inputs on corresponding pins of a device when it is operated within such a socket, the device may establish a particular address range. In still other embodiments, the address range may be permanently established for the device and may be the same for each device. Even if multiple devices are present, the technique used by the system to distinguish between the devices on the memory bus for other accesses may be used to distinguish accesses to the reserved address ranges.

In 1802, the device may respond to accesses to the reserved address range. For example, for read requests, the device may respond as described above with respect to FIG. 16. Similarly, for write requests, the device may respond as described above with respect to FIG. 17.

Figure 19:
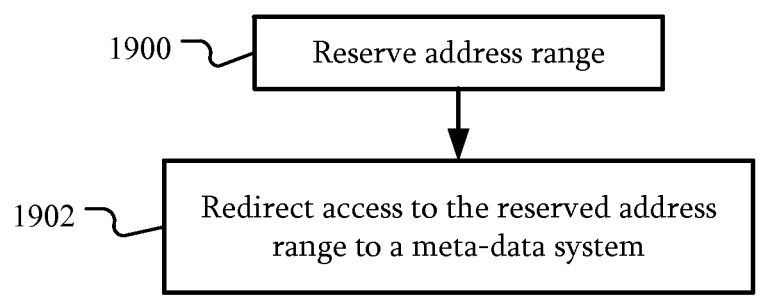
FIG. 19 is a flowchart of a technique of redirecting an access according to an embodiment.

FIG. 19 is a flowchart of a technique of redirecting an access according to an embodiment. In this embodiment, an address range may be reserved in 1900 similar to the reserving in 1800 of FIG. 18. In 1902 accesses to the reserved address range are redirected to a meta-data system of a device. For example, a controller of a device may include a system that is configured to process accesses to meta-data. The controller may be configured to redirect accesses from the normal processing to the meta-data system for processing. Accordingly, the responsivity of the device to accesses to the reserved address range may be functionally different from accesses to addresses outside of the reserved address range.

Figure 20:
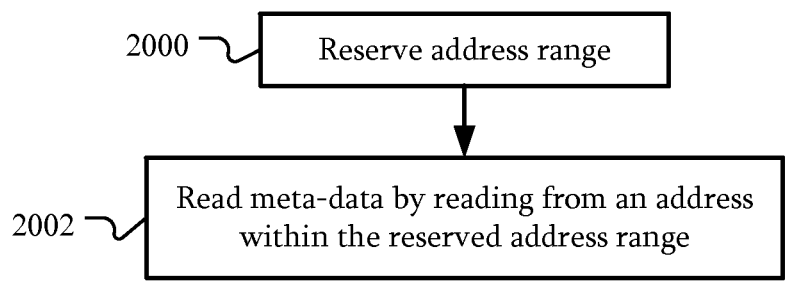
FIG. 20 is a flowchart of a technique of reading meta-data from a reserved address range according to an embodiment.

FIG. 20 is a flowchart of a technique of reading meta-data from a reserved address range according to an embodiment. In this embodiment, an address range is reserved in 2000. While the reservation may be similar to that in FIG. 18, in this embodiment, a processor or other system that is accessing a device reserves the address range. For example, the processor may negotiate with the device to reserve the address range. In another example, the processor may read attributes of the device and reserve the address range for that device accordingly. In yet another example, the processor may determine an address range for a device based on a socket of the device. In still another example, the processor may use a preconfigured address range as the reserved address range.

Regardless, after reserving the address range in 2000, the processor may communicate and control the device with respect to meta-data through that address range. For example, in the processor may read meta-data from the device in 2002 by reading from an address within the reserved address range. In a particular example, error information associated with a memory module may be read by reading from an address within the memory address range.

Figure 21:
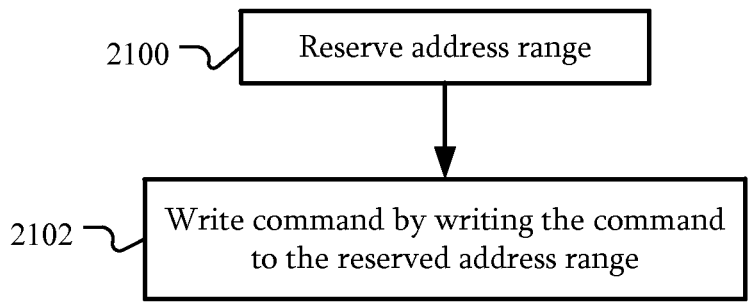
FIG. 21 is a flowchart of a technique of writing a command to a reserved address range according to an embodiment.

FIG. 21 is a flowchart of a technique of writing a command to a reserved address range according to an embodiment. In this embodiment, an address range may be reserved in 2100 similar to the reservation in 2000 of FIG. 20. However, in this embodiment, a command is written to an address of the reserved address range in 2102. Accordingly, a processor may control the operation of the collection of meta-data in a device. In a particular example using a memory module as the device, a command associated with error information may be transmitted to the memory module by writing to an address within the memory address range. That command may indicate, for example, how error information is collected and/or reported through read requests directed to the reserved address range.

Figure 22:
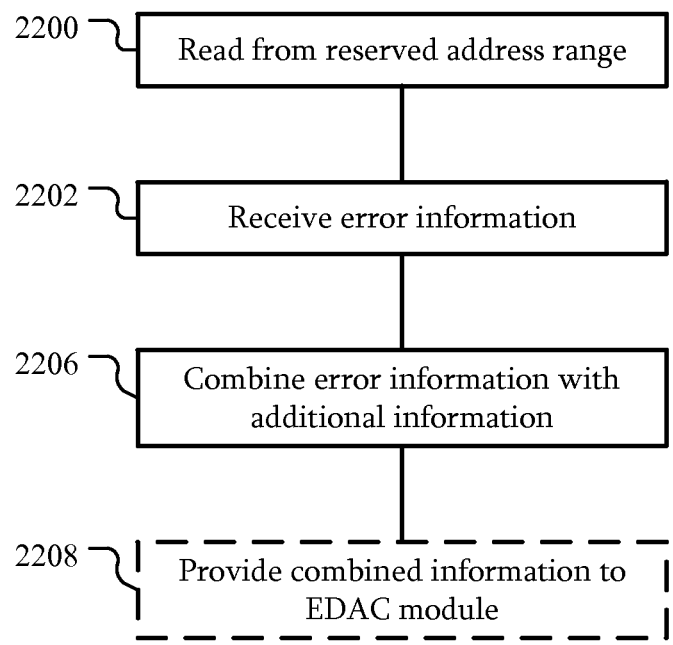
FIG. 22 is a flowchart of a technique of communicating error information according to another embodiment.

FIG. 22 is a flowchart of a technique of communicating error information according to another embodiment. In an embodiment, a processor may read from a reserved address range in 2200. In response, the processor may receive error information in 2202. In 2206, the processor may combine the error information with additional information. As described above, additional information may be any information, such as a status of the processor, peripherals, busses, or the like, including information unrelated to the memory module. In a particular example, the processor may combine the error information with information from a MCA module.

In a particular embodiment, in 2208, the combined information may be provided to an EDAC module. As described above, the EDAC module may make information regarding errors of various systems available to higher level applications.

Figure 23:
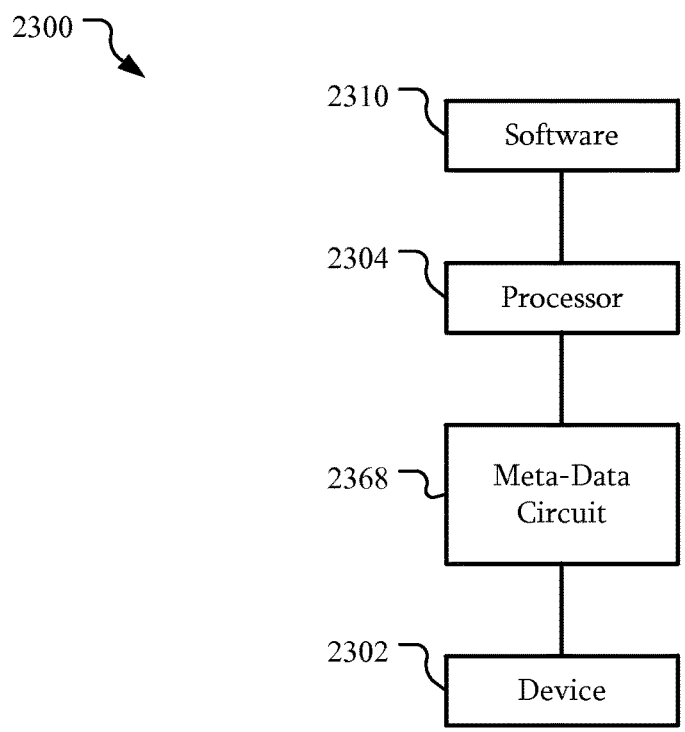
FIG. 23 is a schematic view of a system with a memory system architecture according to an embodiment.

FIG. 23 is a schematic view of a system with a memory system architecture according to an embodiment. In this embodiment, the system 2300 includes a processor 2304 and software 2310 similar to the processor 104 and software 110 of FIG. 2. However, in this embodiment, the system 2300 includes a device 2302 and a meta-data circuit 2368. The meta-data circuit 2368 may be coupled inline with a memory bus. For example, the meta-data circuit 2368 may be an external memory controller.

A memory module will be used as an example of the device 2302. In this example, the memory module 2302 is not configured to correct errors. The memory module is coupled to the meta-data circuit 2368 and is configured to transmit data to the processor 2304 through the meta-data circuit 2368.

The meta-data circuit 2368 is configured to correct errors in data received from the memory 2302. The meta-data circuit 2368 may be configured to intercept accesses from the processor 2304 directed towards the memory module 2302. The meta-data circuit 2368 may be configured to respond to read accesses and write accesses to a reserved address range as described above. Accordingly, while the memory module 2302 or other device 2302 may not be configured to redirect such read and write accesses, the meta-data circuit 2368 may be configured to do so and provide the functions described above.

Figure 24:
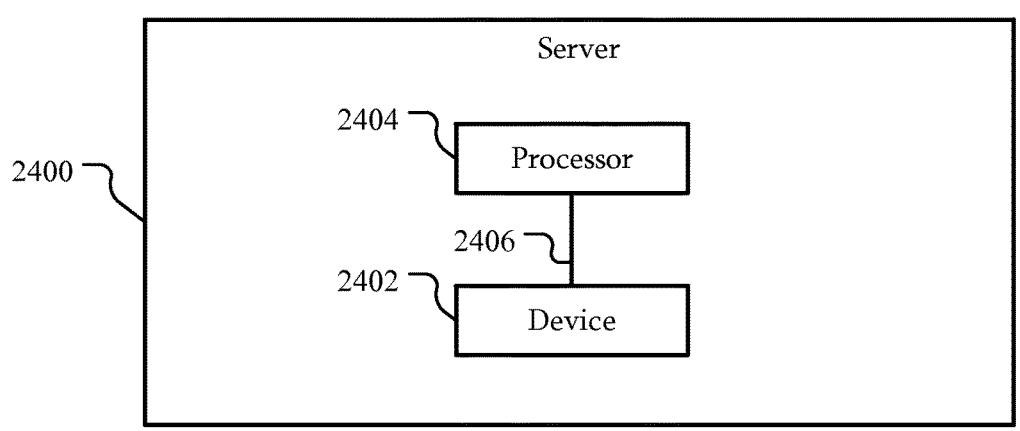
FIG. 24 is a schematic view of a server according to an embodiment.

FIG. 24 is a schematic view of a server according to an embodiment. In this embodiment, the server 2400 may include a stand-alone server, a rack-mounted server, a blade server, or the like. The server 2400 includes a device 2402 and a processor 2404. The processor 2404 is coupled to the device 2402 through the memory bus 2406. The device 2402, processor 2404, and memory bus 2406 may be any of the above described corresponding components.

Figure 25:
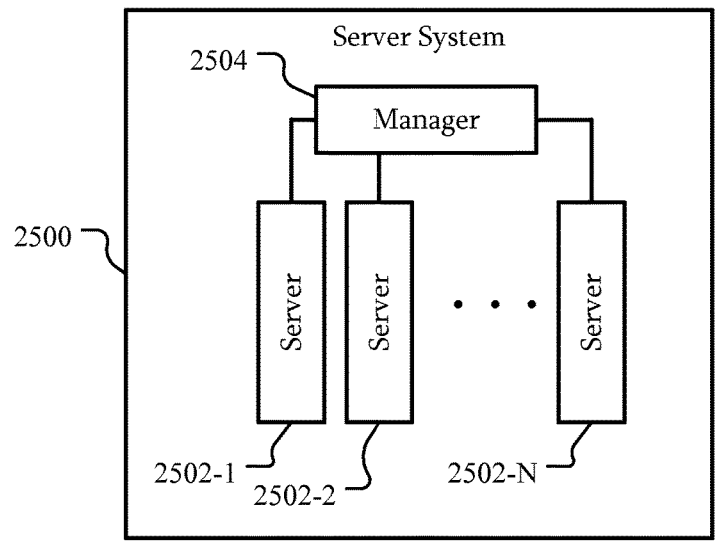
FIG. 25 is a schematic view of a server system according to an embodiment.

FIG. 25 is a schematic view of a server system according to an embodiment. In this embodiment, the server system 2500 includes multiple servers 2502-1 to 2502-N. The servers 2502 are each coupled to a manager 2504. One or more of the servers 2502 may be similar to the server 2300 described above. In addition, the manager 2504 may include a system with a memory system architecture as described above.

The manager 2504 is configured to manage the servers 2502 and other components of the server system 2500. For example, the manager 2504 may be configured to manage the configurations of the servers 2502. Each server 2502 may be configured to communicate error information to the manager 2504. The error information may include correctible error information communicated to a processor in one of the servers 2502 as described above or other error information based on the correctible error information. The manager 2504 may be configured to take actions based on that error information. For example, server 2502-1 may have a number of correctible errors that exceeds a threshold. The manager 2504 may be configured to transfer the functions of that server 2502-1 to server 2502-2 and shutdown server 2502-1 for maintenance and/or replacement. Although a particular example has been given, the manager 2504 may be configured to take other actions based on the error information. Furthermore, although error information has been used as an example of meta-data, other meta-data as described above may be used.

Figure 26:
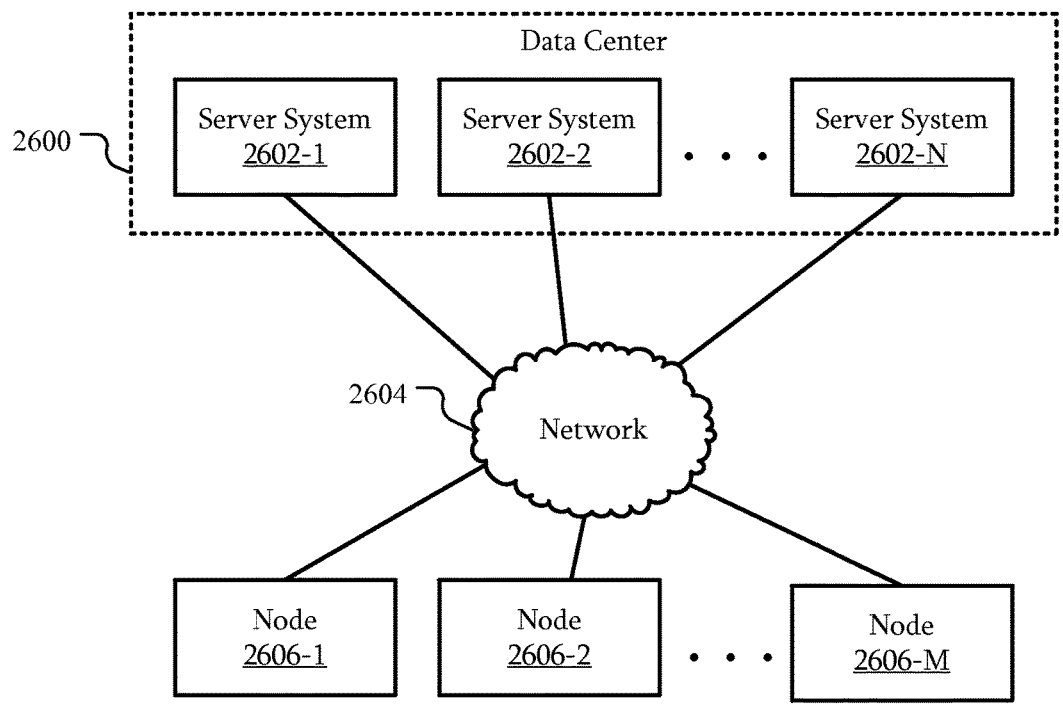
FIG. 26 is a schematic view of a data center according to an embodiment.

FIG. 26 is a schematic view of a data center according to an embodiment. In this embodiment, the data center 2600 includes multiple servers systems 2602-1 to 2602-N. The server systems 2602 may be similar to the server system 2400 described above in FIG. 24. The server systems 2602 are coupled to a network 2604, such as the Internet. Accordingly, the server systems 2602 may communicate through the network 2604 with various nodes 2606-1 to 2606-M. For example, the nodes 2606 may be client computers, other servers, remote data centers, storage systems, or the like.

Although the structures, methods, and systems have been described in accordance with exemplary embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the spirit and scope of the appended claims.

The invention claimed is:

1. A device, comprising:
a memory bus interface receiving a memory access request from a processor;
circuitry; and
a controller coupled to the memory bus interface and the circuitry and between the memory bus interface and the circuitry, and configured to:
collect meta-data associated with the circuitry to generate a collected meta-data; and
enable access to the collected meta-data, without accessing the circuitry, in response to the memory access request received through the memory bus interface,
wherein the meta-data includes error information associated with corrected data of the circuitry, and
wherein the controller is configured to:
receive a read access request through the memory bus interface;
determine if the read access request is associated with a predetermined address range;
if the read access request is not associated with the predetermined address range, respond to the read access request through the memory bus interface with data read from the circuitry; and
if the read access request is associated with the predetermined address range, respond to the read access request through the memory bus interface based on the meta-data.

2. The device of claim 1,
wherein the memory access request is a read access request, and
wherein if the read access request is associated with a predetermined address range, the controller accesses the collected meta-data without accessing the circuitry.

3. The modulo device of claim 1,
wherein the memory access request is a write access request, and
wherein if the write access request is associated with a predetermined address range, the controller adjusts collection of the meta-data based on data associated with the write access request.

4. The device of claim 1, wherein:
the circuitry includes a plurality of memory devices; and
the meta-data includes error information associated with the plurality of memory devices.

5. The device of claim 4,
wherein the error information is collected from the plurality of memory devices,
wherein the controller further generates the meta-data in response to the error information from the plurality of memory devices.

6. The device of claim 4,
wherein the plurality of memory devices each is an error correction code (ECC) memory device so that the plurality of memory devices each performs correction of data, and
wherein the controller is further configured to generate the error information based on the correction of data from the plurality of memory devices.

7. The device of claim 4, wherein:
the circuitry includes other components different from the plurality of memory devices; and
the controller is further configured to read meta-data from the other components and combine the meta-data from the other components with the error information as the collected meta-data.

8. The device of claim 1,
wherein the error information includes an address of the corrected data.

9. A method, comprising:
collecting, at a device, meta-data associated with corrected data stored in the device to generate a collected meta-data, wherein the meta-data includes error information of the corrected data stored in the device, wherein the device is an error correction code (ECC) memory module including a plurality of memory devices and the meta-data includes error information associated with the memory devices;
storing the collected meta-data to a register;
receiving, at the device, a read access request from a processor through a memory bus interface;
accessing, in response to the read access request, at least part of the meta-data stored in the register without accessing the device;
reserving an address range associated with the register storing the collected meta-data; and
responding to other read access requests received at the device through the memory bus interface,
wherein the read access request is associated with the address range,
wherein the other read access requests are not associated with the address range, and
wherein collecting of the meta-data comprises generating error information based on correction of data read from the plurality of memory devices in response to the other read access requests that are not associated with the address range.

10. The method of claim 9, further comprising:
reserving an address range associated with the register storing the collected meta-data, and wherein if the read access request is associated with the address range, the accessing at least part of the meta-data includes redirecting of the read access request to the register without accessing to the device.

11. The method of claim 9, further comprising:
reserving an address range associated with the device;
receiving, at a device, a write access request through the memory bus interface associated with the address range; and
if the write access request is associated with the address range, adjusting the collecting of the meta-data based on data associated with the write access request.

12. The method of claim 9,
wherein the error information includes an address of the corrected data.

* * * * *